United States Patent [19]

Springer et al.

[11] Patent Number: 5,278,292

[45] Date of Patent: Jan. 11, 1994

[54] FIBER-REACTIVE DYES WHICH CONTAIN A UREIDOALKYLENE GROUP

[75] Inventors: Hartmut Springer, Königstein; Rolf Gleissner; Günther Schwaiger, both of Frankfurt am Main, all of Fed. Rep. of Germany

[73] Assignee: Hoechst Aktiengesellschaft, Frankfurt, Fed. Rep. of Germany

[21] Appl. No.: 915,840

[22] PCT Filed: Jan. 14, 1991

[86] PCT No.: PCT/EP91/00041

§ 371 Date: Jul. 17, 1992

§ 102(e) Date: Jul. 17, 1992

[87] PCT Pub. No.: WO91/10709

PCT Pub. Date: Jul. 25, 1991

[30] Foreign Application Priority Data

Jan. 18, 1990 [DE] Fed. Rep. of Germany ....... 4001315

[51] Int. Cl.$^5$ .................. C09B 62/503; C09B 43/124; D06P 1/384
[52] U.S. Cl. ..................... 534/618; 534/617; 534/622; 534/629; 534/632; 534/638; 534/642; 534/643; 540/132; 540/133; 540/134; 544/76; 552/231; 8/549
[58] Field of Search ............... 534/617, 618, 622, 629, 534/632, 638, 642, 643; 540/132–134; 544/76; 552/231; 8/549

[56] References Cited

U.S. PATENT DOCUMENTS

| | | | |
|---|---|---|---|
| 3,419,542 | 12/1968 | Meininger et al. | 534/642 |
| 3,647,827 | 3/1972 | Sigiyama et al. | 540/132 |
| 4,818,814 | 4/1989 | Schlafer | 534/642 |
| 4,841,028 | 6/1989 | Aeschilmann et al. | 534/629 |

FOREIGN PATENT DOCUMENTS

| | | |
|---|---|---|
| 0174909 | 3/1986 | European Pat. Off. . |
| 0265857 | 5/1988 | European Pat. Off. . |
| 1580134 | 9/1969 | France . |

Primary Examiner—Mark C. Lee
Assistant Examiner—Fiona T. Powers
Attorney, Agent, or Firm—Connolly and Hutz

[57] ABSTRACT

Water-soluble fiber-reactive dyes are described conforming to the below-indicated formula (1) which are capable of dyeing hydroxyl- and/or carboxamido-containing material, in particular fiber material, such as wool and in particular cellulose fiber materials, in strong, fast shades.

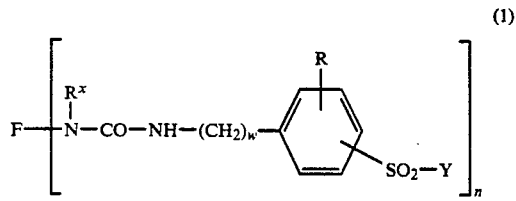

in which

F is the radical of a monoazo, polyazo, metal complex azo, anthraquinone, phthalocyanine, triphenoldioxazine, azomethine, dioxazine, phenazine, stilbene, triphenylmethane, xanthene, formazan, thioxanthone, nitroaryl, naphthoquinone, pyrenequinone or perylenetetracarbimide dye;

$R^x$ is hydrogen or alkyl of 1 to 4 carbon atoms;

R is hydrogen, sulfo, carboxyl, alkyl of 1 to 4 carbon atoms, alkoxy of 1 to 4 carbon atoms or chlorine;

w is 1, 2, 3 or 4;

Y is vinyl or an ethyl group which contains in the β-position a substituent which is eliminable by alkali to form a vinyl group;

n is 1 or 2.

21 Claims, No Drawings

FIBER-REACTIVE DYES WHICH CONTAIN A UREIDOALKYLENE GROUP

The present invention relates to the field of fiber-reactive dyes.

U.S. Pat. No. 3,419,542 and European Patent Application Publications Nos. 0 174 909 A1 and 0 265 857 A1 disclose dyes whose fiber-reactive group of the vinyl sulfone series is bonded to the dye chromophore via a phenylureido or alkylureido radical. However, these dyes appear to be in need of improvement, partly in respect of their degrees of fixation if deep shades are to be achieved by the exhaust method, partly in respect of their solubility if they are to be applied in the short-time pad-batch process.

The present invention, then, makes available dyes which possess fiber-reactive properties and thus are interesting for economical dyeing, of the formula (1)

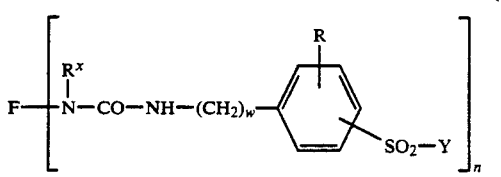

in which

F is the radical of a monoazo, polyazo, metal complex azo, anthraquinone, phthalocyanine, azomethine, dioxazine, phenazine, stilbene, triphenylmethane, xanthene, formazan, thioxanthone, nitroaryl, naphthoquinone, pyrenequinone or perylenetetracarbimide dye;

$R^x$ is hydrogen or alkyl of 1 to 4 carbon atoms, such as methyl or ethyl, preferably hydrogen;

R is hydrogen, sulfo, carboxyl, alkyl of 1 to 4 carbon atoms, such as ethyl or in particular methyl, alkoxy of 1 to 4 carbon atoms, such as ethoxy or in particular methoxy, or chlorine, but preferably hydrogen;

w is 1, 2, 3 or 4, preferably 1 or 2, especially 2;

Y is vinyl or an ethyl group which contains in the β-position a substituent which is eliminable by alkali to form a vinyl group;

n is 1 or 2, preferably 1.

Preferably, F is the radical of a monoazo or disazo dye or the radical of a metal complex azo dye, such as an o,o'-1:1 copper complex azo dye, or of a triphendioxazine or of an anthraquinone or of a phthalocyanine dye, such as a copper phthalocyanine dye, or of a copper formazan dye.

The radical F may contain bonded to its basic skeleton the substituents customary in organic dyes, including fiber-reactive groups, for example those of the above-defined formula —$SO_2$—Y. Such substituents are for example: alkyl groups of 1 to 4 carbon atoms, such as methyl, ethyl, propyl, isopropyl or butyl, preferably ethyl and in particular methyl; alkoxy groups of 1 to 4 carbon atoms, such as methoxy, ethoxy, propoxy, isopropoxy and butoxy, preferably ethoxy and in particular methoxy; acylamino groups of 2 to 8 carbon atoms, such as acetylamino, propionylamino or benzoylamino; primary and mono- or disubstituted amino groups, for example by alkyl groups of 1 to 4 carbon atoms and/or phenyl groups, such as monoalkylamino and dialkylamino groups having 1 to 4 carbon atoms in the alkyl moiety, phenylamino or N-($C_1$–$C_4$-alkyl)-N-phenylamino groups, wherein the alkyl moiety may be further substituted, for example by phenyl, sulfophenyl, hydroxyl, sulfato, sulfo and carboxyl, and the phenyl groups may be further substituted, for example by chlorine, sulfo, carboxyl, methyl and/or methoxy, e.g. methylamino, ethylamino, propylamino, isopropylamino, butylamino, N,N-di-(β-hydroxyethyl)amino, N,N-di(β-sulfatoethyl)amino, sulfobenzylamino, N,N-di(sulfobenzyl)amino and diethylamino groups and also phenylamino and sulfophenylamino groups; alkoxycarbonyl groups having one alkyl moiety of 1 to 4 carbon atoms, such as methoxycarbonyl and ethoxycarbonyl; alkylsulfonyl groups of 1 to 4 carbon atoms, such as methylsulfonyl and ethylsulfonyl groups; trifluoromethyl, nitro and cyano groups; halogen atoms, such as fluorine, chlorine or bromine; carbamoyl groups which may be monosubstituted or disubstituted by alkyl of 1 to 4 carbon atoms, which alkyl may in turn be substituted, for example by hydroxyl, sulfato, sulfo, carboxyl, phenyl and sulfophenyl, e.g. N-methylcarbamoyl and N-ethylcarbamoyl; sulfamoyl groups which may be monosubstituted or disubstituted by alkyl groups of 1 to 4 carbon atoms, and N-phenyl-N-alkylsulfamoyl groups having an alkyl group of 1 to 4 carbon atoms, wherein these alkyl groups may in turn be substituted by hydroxyl, sulfato, sulfo, carboxyl, phenyl and sulfophenyl, e.g. N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di(β-hydroxyethyl)sulfamoyl; N-phenylsulfamoyl, ureido, hydroxyl, carboxyl, sulfomethyl and sulfo groups; β-sulfatoethylsulfonyl, β-thiosulfatoethylsulfonyl, β-phosphatoethylsulfonyl, β-acetyloxyethylsulfonyl, β-chloroethylsulfonyl and vinylsulfonyl groups.

Preferably, the dye radical F is substituted by one or more, such as 2 to 4, sulfo groups and it preferably contains substituents selected from the group consisting of sulfo, methyl, ethyl, methoxy, ethoxy, alkanoylamino of 2 to 5 carbon atoms such as acetylamino, benzoylamino, amino, chlorine, bromine, ureido, hydroxyl, carboxyl and sulfomethyl.

The present invention thus relates to dyes where the fiber-reactive grouping according to the present invention comprises one or two groups of the formula (2)

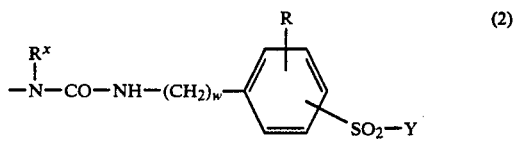

where $R^x$, w, R and Y are each as defined above.

The dye radical F may also contain other fiber-reactive groups from the literature which do not conform to the constitution of formula (2). Such known fiber-reactive groups are for example a group of the vinyl sulfone series, such as the abovementioned group of the formula —$SO_2$—Y where Y has the above meaning, which may be bonded to F via an alkylene radical of 1 to 4 carbon atoms, such as a methylene group, or via a methylamino or ethylamino group, or a low molecular weight alkanoyl radical which is substituted by a detachable atom or group, a low molecular weight alkenoyl or alkenesulfonyl radical which may be substituted by a detachable atom or group, a carbocyclic or heterocyclic radical containing a four-, five- or six-membered ring which is substituted by a detachable atom or group via a carbonyl or sulfonyl group, or a triazine or pyrimidine radical which is attached directly via an amino group and substituted by a detachable atom or group. Such groups are for example an amino-attached, halogen-containing six-membered heterocyclic radical, such as a halotriazine or halopyrimidine radical, or an aliphatic acyl radical, such as a haloacetyl or halopropionyl radical.

Of the 1:1 copper complex azo dyes according to the present invention, those of the benzene and naphthalene series are preferred.

Preferred monoazo and disazo dyes of the formula (1) are for example those of the formulae (3a), (3b) and (3c)

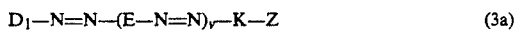    (3a)

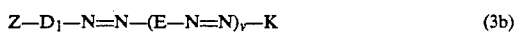    (3b)

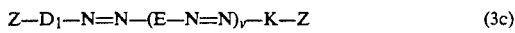    (3c)

and the metal complex compounds derived therefrom, such as 1:1 copper complex compounds, in which $D_1$ is the radical of a diazo component of the benzene or naphthalene series, E is the radical of a middle component of the benzene or naphthalene series, K is the radical of a coupling component of the benzene, naphthalene, pyrazolone, 6-hydroxy-2-pyridone or acetoacetarylamide series, where $D_1$, E and K may contain substituents customary for azo dyes such as hydroxyl, amino, methyl, methoxy, ethoxy, sulfo, carboxyl, substituted or unsubstituted alkanoylamino groups of 2 to 4 carbon atoms in the alkanoyl radical, substituted or unsubstituted benzoylamino groups, and halogen atoms, such as bromine and chlorine atoms, and $D_1$, E and K together possess at least two sulfo groups, preferably three or four sulfo groups, v is zero or 1 and Z is a group of the formula (2).

Preference is given further to disazo dyes of the formula (3d) or (3e)

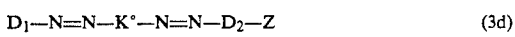    (3d)

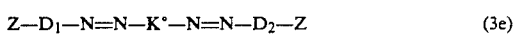    (3e)

in which $D_1$ and $D_2$ are each independently of the other the radical of a diazo component of the benzene or naphthalene series and $K°$ is the radical of a bivalent coupling component of the naphthalene series, where $D_1$, $D_2$ and $K°$ may carry the substituents customary for azo dyes, such as those mentioned above, and together contain at least two sulfo groups, preferably three or four sulfo groups. Such azo dyes of the formula (1) are in particular dyes of the formulae (4a), (4b) and (4c)

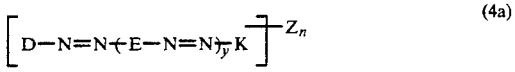    (4a)

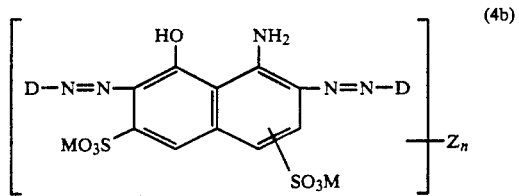    (4b)

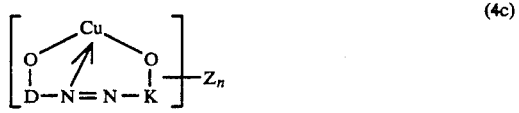    (4c)

in which

D is in each case the radical of a diazo component, which are identical or different in meaning, for example a radical $D_1$ of the above meaning, E is the bivalent radical of a couplable and diazotizable compound, for example of the above meaning, K is the radical of a coupling component, for example of the above meaning, v is zero or 1, Z is a radical of the formula (2), n is 1 or 2, preferably 1, and the radical Z is bonded to the radical D or the radical K or if n is 2 to both D and K or to the two D radicals, and M is a hydrogen atom or an alkali metal, such as sodium, potassium or lithium.

Examples of ethyl groups Y having an alkali-eliminable substituent in the $\beta$-position are $\beta$-sulfatoethyl, $\beta$-thiosulfatoethyl, $\beta$-phosphatoethyl, $\beta$-alkanoyloxyethyl having 2 to 5 carbon atoms in the alkanoyl moiety, such as $\beta$-acetyloxyethyl, $\beta$-benzoyloxyethyl-, $\beta$-(sulfobenzoyloxy)ethyl, $\beta$-(p-toluenesulfonyloxy)ethyl and $\beta$-haloethyl, such as $\beta$-bromoethyl or $\beta$-chloroethyl, preferably $\beta$-chloroethyl, and in particular $\beta$-sulfatoethyl. Preferably, Y is vinyl, particularly preferably it is $\beta$-chloroethyl or $\beta$-sulfatoethyl.

The various ways of synthesizing the dyes according to the present invention will be described later. One way is a coupling reaction of appropriate starting diazo and coupling components.

Such starting compounds are for example the following amino compounds, which may be used as diazo components: aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3- or -4-sulfonamide, -N-methylamide, -N-ethylamide, -N,N-dimethylamide or -N,N-diethylamide, dehydrothio-p-toluidinesulfonic acid, 1-amino-4-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino- 2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1amino-3- or -4-nitrobenzene-6 -sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylamino-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene,4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminobiphenyl (biphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'-aminobenzoylamino)-1-aminobenzene-6-sulfonic acid, 3-(4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,3-diaminobenzene-5-carboxylic acid, 1,4-diamino-2-methylbenzene, 4,4'-diaminodiphenyl oxide, 4,4,-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid, 2-($\beta$-sulfatoethylsulfonyl)phenylaniline, 3-($\beta$-sulfatoethylsulfonyl)aniline, 4-($\beta$-sulfatoethylsulfonyl)aniline, 2-carboxy-5-($\beta$-sulfatoethylsulfonyl)aniline, 2-chloro-3-($\beta$-sulfatoethylsulfonyl)aniline, 2-chloro-4-($\beta$-sulfatoethylsulfonyl)aniline, 2-ethoxy-4- or -5-($\beta$-sulfatoethylsulfonyl)aniline, 2-ethyl-4-($\beta$-sulfatoethylsulfonyl)aniline, 2-methoxy-5-($\beta$-sulfatoethylsulfonyl)aniline, 2,4-diethoxy-5-($\beta$-sulfatoethylsulfonyl)aniline, 2,4-dimethoxy-5-($\beta$-sulfatoethylsulfonyl)aniline, 2,5-dimethoxy-4-($\beta$-sulfatoethylsulfonyl)aniline, 2-methoxy-5-methyl-4-($\beta$-sulfatoethylsulfonyl)aniline, 2- or 3- or 4-($\beta$-thiosulfatoethylsulfonyl)aniline, 2-methoxy-5-($\beta$-thiosulfatoethylsulfonyl)aniline, 2-sulfo-4-($\beta$-phosphatoethylsulfonyl-)aniline,2-sulfo-4-vinylsulfonylaniline,2-hydroxy-4- or -5-($\beta$-sulfatoethylsulfonyl)aniline, 2-chloro-4- or -5-($\beta$-chloroethylsulfonyl)aniline, 2-hydroxy-3-sulfo-5-($\beta$-sulfatoethylsulfonyl)aniline, 3- or 4-($\beta$-acetoxyethylsulfonyl)aniline, 2-methoxy-4-[$\beta$-(N-methyltauryl)ethylsulfonyl]aniline, 5-($\beta$-sulfatoethylsulfonyl)-2-aminonaphthalene, 6- or 7- or 8-($\beta$-sulfatoethylsulfonyl)-2-aminonaphthalene, 6-($\beta$-sulfatoethylsulfonyl)-1-sulfo-2-aminonaphthalene, 5-($\beta$-sulfatoethylsulfonyl)-1-sulfo-2-aminonaphthalene, 8-($\beta$-sulfatoethylsulfonyl)-6-sulfo-2-aminonaphthalene.

If in the synthesis according to the present invention the diazo component used is not a diamine but an aminoacetylamino compound from which the acetyl group is subsequently re-eliminated by hydrolysis, it is possible to use the monoacetyl compounds of the abovementioned diazo components, for example 1-acetylamino-3-aminobenzene-4-sulfonic acid and 1-acetylamino-4-aminobenzene-3-sulfonic acid.

Coupling components which can be used for synthesizing the azo dyes according to the present invention are for example: phenol, 1-hydroxy-3- or -4-methylbenzene, 1-hydroxybenzene-4-sulfonic acid, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid,2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methylamino- or 2-ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid,2- acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxy-naphthalene-3,6- or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4,,8'-disulfonaphth-2'-yl)-3-methyl-5-pyrazolone, 1-(5,,7'-disulfonaphth-2'-yl)-3-methyl-5-pyrazolone, 1-(2,,5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbonyl-4-methyl-6-hydroxy-2-pyridone, 1-ethyl-3-sulfomethyl-4-methyl-5-carbonyl-6-hydroxy-2-pyridone, N-acetoacetyl-aminobenzene, 1-(N-acetoacetylamino)-2-methoxybenzene-5-sulfonic acid, 4-hydroxyquinol-2-one, 1-amino-8-hydroxy-2-(phenylazo)naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfonylphenylazo)-naphthalene-3,6-disulfonic acid, 1-(β-aminoethyl)-3-cyano-4-methyl-6-hydroxy-2-pyridone, 1-(γ-aminopropyl)-3-sulfomethyl-4-methyl-6-hydroxy-2-pyridone,1,3-diaminobenzene, 1-amino-3-N,N-di(β-hydroxyethyl)-aminobenzene, 1-amino-3-N,N-di(β-sulfatoethyl)-aminobenzene, 1-amino-3-N,N-di(β-hydroxyethyl)-amino-4-methoxybenzene, 1-amino-3-N,N-di(β-sulfatoethyl)-amino-4-methoxybenzene, 1-amino-3-sulfobenzylaminobenzene, 1-amino-3-sulfobenzylamino-4-chlorobenzene, 1-amino-3-N,N-di(sulfobenzyl)-aminobenzene, 2-(4-β-sulfatoethylsulfonylphenyl)-3-methyl-5-pyrazolone and 1-(4-β-sulfatoethylsulfonylphenyl)-3-carboxy-5-pyrazolone.

Aromatic radicals D of diazo components D—NH₂ which do not carry any fiber-reactive group of the formula (2) are for example those of the amines of the formulae (5a) and (5b)

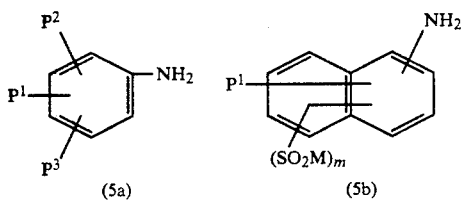

(5a)    (5b)

in which

P¹ is a hydrogen, a sulfo group or a group of the formula —SO₂—Y where Y is as defined above, P² is hydrogen, methyl, ethyl, methoxy, ethoxy, alkanoyl of 2 to 5 carbon atoms, such as acetyl and propionyl, cyano, carboxyl, sulfo, alkoxycarbonyl of 2 to 5 carbon atoms, carbamoyl, N-(C₁-C₄-alkyl)carbamoyl, fluorine, chlorine, bromine or trifluoromethyl, P³ is hydrogen, methyl, ethyl, methoxy, ethoxy, cyano, carboxyl, sulfo, alkanoylamino of 2 to 5 carbon atoms, such as acetylamino, alkoxycarbonyl of 2 to 5 carbon atoms, carbamoyl, N-(C₁-C₄-alkyl)carbamoyl, fluorine, chlorine, nitro, sulfamoyl, N-(C₁-C₄-alkyl)sulfamoyl, alkylsulfonyl of 1 to 4 carbon atoms, phenylsulfonyl or phenoxy, where the benzene or the naphthalene nucleus may also contain a hydroxyl group ortho to the NH₂ group, m is zero, 1 or 2 (this group being hydrogen in the case of m being zero) and M is as defined above.

Preferably, P² is hydrogen, methyl, methoxy, carboxyl or sulfo and P³ is hydrogen, methyl, methoxy, carboxyl, sulfo or acetylamino.

Aromatic amines of the formula D—NH₂ conforming to the formulae (5a) and (5b) are for example: 2-, 3- or 4-aminobenzoic acid, 3-chloroaniline-6-carboxylic acid, aniline-2- or -3- or -4-sulfonic acid, 2,5-disulfoaniline, 2,4-disulfoaniline, 3,5-disulfoaniline, 2-aminotoluene-4-sulfonic acid, 2-aminoanisole-4-sulfonic acid, 2-aminoanisole-5-sulfonic acid,4-aminoanisole-2-sulfonic acid, 2-ethoxyaniline-5-sulfonic acid, 2-ethoxyaniline-4-sulfonic acid, 4-sulfo-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid,4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3-sulfonic acid or -4-sulfonic acid, 3-acetylamino-6-sulfoaniline, 4-acetylamino-2-sulfoaniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5-sulfonic acid or -6- or -8-sulfonic acid, 1-aminonaphthalene-3,6,8-trisulfonic acid, 2-aminonaphthalene-6,8-disulfonic acid, 2-aminonaphthalene-1,5-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 4-(β-sulfatoethylsulfonyl]-aniline, 3-(β-sulfatoethylsulfonyl)-aniline, 2-sulfo-5-(β-sulfatoethylsulfonyl)-aniline, 2-sulfo-4-(β-sulfatoethylsulfonyl)-aniline, 2-methoxy-5-(β-sulfatoethylsulfonyl)-aniline, 2-methoxy-5-methyl-4-(β-sulfatoethylsulfonyl)-aniline, 2,5-dimethoxy-4-(β-sulfatoethylsulfonyl)aniline, 2-amino-5-(β-sulfatoethylsulfonyl)-phenol, 2-amino-4-(β-sulfatoethylsulfonyl)-phenol, 2-amino-6-(β-sulfatoethylsulfonyl)-naphthalene-8-sulfonic acid, 2-amino-6-(β-sulfatoethylsulfonyl)-naphthalene-1-sulfonic acid, 2-amino-8-(β-sulfatoethylsulfonyl)-naphthalene-6-sulfonic acid, 2-amino-5-(β-sulfatoethylsulfonyl)-naphthalene-7-sulfonic acid and 2-amino-7-(β-sulfatoethylsulfonyl)-naphthalene-5-sulfonic acid.

Aromatic amines of the diazo component Z-D—NH₂ containing a fiber-reactive radical Z are preferably derived from aromatic amines of the formulae (6a) and (6b)

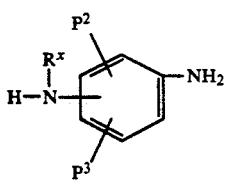

(6a)

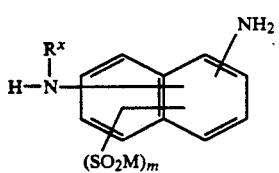

(6b)

in which $R^x$, M, m, $P^2$ and $P^3$ have the abovementioned, in particular the preferred, meanings and the benzene ring may additionally contain a hydroxyl group ortho to the amino group —NH$_2$.

Amines of the formulae (6) are for example: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,5-diamino-4-methylbenzene-2-sulfonic acid, 1,5-diamino- 4-methoxybenzene-2-sulfonic acid, 1,3-diaminobenzene-5-sulfonic acid, 1,3-diamino-5-methylbenzene, 2,6-diaminonaphthalene, 2,6-diaminonaphthalene-4,8-disulfonic acid, 2-amino-5-methylaminonaphthalene-1-sulfonic acid, 2-amino-5-methylaminonaphthalene-1,7-disulfonic acid and 1,4-diaminonaphthalene-6-sulfonic acid.

Preferred radicals $D_1$ in the formula (3a) and (3d) are those of the formula (5c) and (5d); preferred radicals Z—$D_1$— and Z—$D_2$— and also Z—D in the formulae (3b) to (3e) on the one hand and (4a) and (4b) on the other are those of the formula (5g), and preferred radicals D and Z—D in the formula (4c) are those of the formulae (5e) and (5f) on the one hand or (5h) on the other:

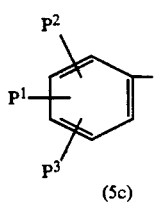

(5c)

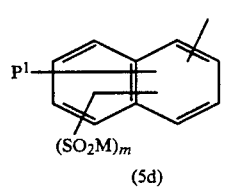

(5d)

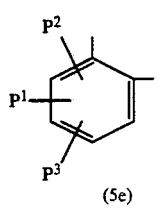

(5e)

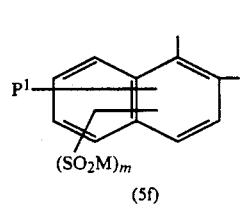

(5f)

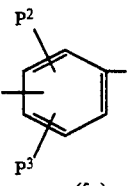

(5g),

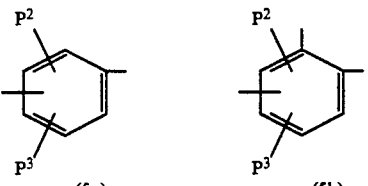

(5h)

in which $P^1$, $P^2$, $P^3$, m and M are as defined above.

Aromatic radicals E of a couplable and diazotizable compound of the formula H—E—NH$_2$ are for example those of the formulae (7a), (7b) and (7c)

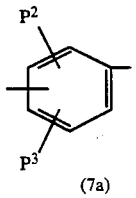

(7a)

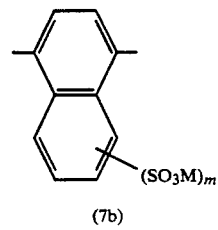

(7b)

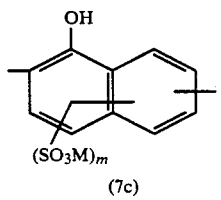

(7c)

in which $P^2$ and M have the abovementioned meanings, $P^4$ is a hydrogen atom, an alkyl group of 1 to 4 carbon atoms, such as methyl or ethyl, an alkoxy group of 1 to 4 carbon atoms, such as methoxy or ethoxy, a chlorine atom, an alkanoylamino group of 2 to 5 carbon atoms, such as acetylamino or propionylamino, a benzoylamino group, a ureido group, a phenylureido group, an alkylureido group having 1 to 4 carbon atoms in the alkyl moiety, a phenylsulfonyl group or an alkylsulfonyl group of 1 to 4 carbon atoms, and m is zero, 1 or 2 (this group being hydrogen in the case of m being zero).

Compounds of the formula H—E—NH$_2$ are for example: aniline, I5 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1-aminonaphthalene, 1-aminonaphthalene-6- or -7- or -8-sulfonic acid, 3-acetylaminoaniline, 2-methylaniline, 2-methoxyaniline, 3-benzoylaminoaniline, 2,3-dimethylaniline, 3,5-dimethylaniline, 1-amino-2-methoxy-5-acetylaminobenzene, 3-propionylaminoaniline, 3-butyrylaminoaniline, 2-sulfo-5-acetylaminoaniline, 2-amino-5-naphthol-7-sulfonic acid and 2-amino-8-naphthol-6-sulfonic acid.

The radicals K of the coupling component are preferably of the aniline, naphthalene, pyrazole and acylacetarylide series; they may possess fiber-reactive groups.

Coupling components of the formula H—K of the aniline and naphthalene series are for example the anilines, N-monosubstituted and N,N-disubstituted anilines, m-phenylenediamines and derivatives thereof, naphtholsulfonic acids, aminonaphthalenes, naphthols, hydroxynaphthoic acid derivatives, aminonaphthalenesulfonic acids or aminonaphtholsulfonic acids. Coupling components of the formula H—K which do not carry any fiber-reactive group of the formula (2) are for example compounds of the formulae (8a) to (8g)

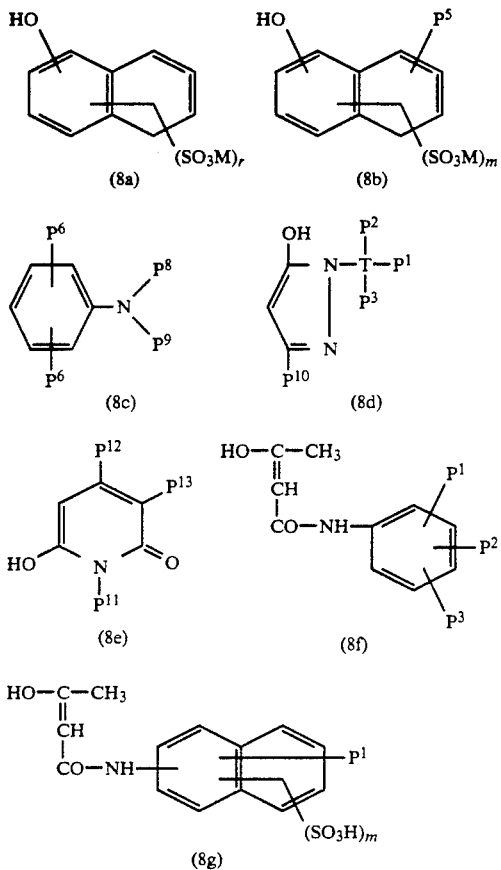

in which

P¹, P², P³, m and M have the abovementioned meanings, r is zero, 1, 2 or 3 (this group being a hydrogen atom in the case of r being zero), $P^5$ is alkylureido having alkyl groups of 1 to 6 carbon atoms, phenylureido, phenylureido which is substituted in the phenyl moiety by chlorine, methyl, methoxy, nitro, sulfo and/or carboxyl and/or a group —SO₂—Y where Y has the above meaning, alkanoylamino of 2 to 7 carbon atoms, such as acetylamino or propionylamino, cyclohexanoylamino, benzoylamino or benzoylamino which is substituted in the benzene moiety by chlorine, methyl, methoxy, nitro, sulfo and/or carboxyl and/or a group —SO₂—Y where Y has the above meaning, $P^6$ is hydrogen, alkyl of 1 to 4 carbon atoms, such as methyl or ethyl, alkoxy of 1 to 4 carbon atoms, such as methoxy or ethoxy, bromine, chlorine or alkanoylamino of 2 to 7 carbon atoms, such as acetylamino or propionylamino, $P^7$ is hydrogen, alkyl of 1 to 4 carbon atoms, such as methyl or ethyl, alkoxy of 1 to 4 carbon atoms, such as methoxy and ethoxy, chlorine or alkanoylamino of 2 to 7 carbon atoms, such as acetylamino or propionylamino, a ureido group or a phenylureido group, $P^8$ is hydrogen or alkyl of 1 to 4 carbon atoms which may be substituted by hydroxyl, cyano, carboxyl, sulfo, sulfato, methoxycarbonyl, ethoxycarbonyl or acetoxy, $P^9$ is alkyl of 1 to 4 carbon atoms which may be substituted by hydroxyl, cyano, carboxyl, sulfo, sulfato, methoxycarbonyl, ethoxycarbonyl or acetoxy, or is benzyl or phenyl or phenyl which is substituted by alkyl of 1 to 4 carbon atoms, alkoxy of 1 to 4 carbon atoms, chlorine and/or sulfo, $P^{10}$ is hydrogen, alkyl of 1 to 4 carbon atoms, such as methyl, cyano, carboxyl, carbalkoxy of 2 to 5 carbon atoms, such as carbomethoxy or carbethoxy, carbamoyl or phenyl, preferably methyl, carboxyl, methoxycarbonyl, ethoxycarbonyl or phenyl, or in particular methyl or carboxyl, T is a benzene or naphthalene ring, preferably a benzene ring, $P^{11}$ is hydrogen, alkyl of 1 to 6 carbon atoms, preferably 1 to 4 carbon atoms, which may be substituted by phenyl or sulfophenyl or by hydroxyl, amino, methoxy, ethoxy, carboxyl, sulfo, acetylamino, benzoylamino or cyano, cyclohexyl, phenyl or carboxyl-, sulfo, benzoylamino-, acetylamino-, methyl-, methoxy-, cyano- or chlorine-substituted phenyl, preferably being hydrogen or alkyl of 1 to 4 carbon atoms which may be substituted by phenyl, sulfo or sulfophenyl, $P^{12}$ is a hydrogen atom or an alkyl group of 1 to 4 carbon atoms, such as methyl, or an alkyl group of 1 to 4 carbon atoms which is substituted by alkoxy of 1 to 4 carbon atoms, such as methoxy, or cyano, preferably being alkyl of 1 to 4 carbon atoms or phenyl, and $P^{13}$ is hydrogen, chlorine, bromine, sulfo, carbamoyl, methylsulfonyl, phenylsulfonyl, cyano or sulfoalkyl of 1 to 4 carbon atoms, preferably being hydrogen, sulfo or sulfoalkyl having an alkyl moiety of 1 to 4 carbon atoms, such as sulfomethyl, or cyano or carbamoyl.

Compounds of the formulae (8) are for example 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 2-acetylamino-5-hydroxynaphthalene-7-sulfonic acid, 3-acetylamino-5-hydroxynaphthalene-7-sulfonic acid, 2-methylamino-8-hydroxynaphthalene-6-sulfonic or 2-(3'- and 4'-sulfophenyl)-amino-8-hydroxynaphthalene-6-sulfonic acid, 3-(3'- and 4'-sulfophenyl)-amino-8-hydroxynaphthalene-6-sulfonic acid, N,N-di(β-sulfoethyl)aniline and its derivatives with monosubstitution or disubstitution by methyl, methoxy and/or ethoxy in the benzene ring, N-ethyl-N-(β-sulfoethyl)aniline, N-(β-sulfoethyl)aniline, N-(β-carboxyethyl)aniline and their derivatives with monosubstitution or disubstitution by methyl, methoxy and/or ethoxy in the benzene ring, also 1-[3'-(β-chloroethylsulfonyl)benzoylamino]-3,6-disulfo-8-naphthol, 1-[3'-(vinylsulfonyl)benzoylamino]-3,6-disulfo-8-naphthol, 1-[3'-sulfatoethylsulfonyl)benzoylamino]-4,6-disulfo-8-naphthol, 2-[3'-(β-chloroethylsulfonyl)benzoylamino]-6-sulfo-8-naphthol, 2-[3'-(vinylsulfonyl)benzoylamino]-6-sulfo-8-naphthol, 3-[3'-(β-chloroethylsulfonyl)-benzoylamino]-6-sulfo-8-naphthol, 3-[3'-(vinylsulfonyl)-benzoylamino]-6-sulfo-8-naphthol, 2-[N-methyl-N-(β-sulfatoethylsulfonyl)amino]- 6-sulfo-8-naphthol, 3-[N-methyl-N-(β-sulfatoethylsulfonyl)amino]-6-sulfo-8-naphthol, 2-[N-ethyl-N-(β-sulfatoethylsulfonyl)amino]-6-sulfo-8-naphthol, 1-[N'-(3'-β-chloroethylsulfonylphenyl)-ureido]-3,6-disulfo-8-naphthol, 1-[N'-(3'-vinylsulfonylphenyl)ureido]-3,6-disulfo-8-naphthol, 1-[N'-(2'-vinylsulfonylethyl)ureido]-3,6-disulfo-8-naphthol, 1-[N'-(3'-β-chloroethylsulfonylphenyl)ureido]-4,6-disulfo-8-naphthol, 1-[N'-(3'-vinylsulfonylphenyl)ureido]-4,6-disulfo-8-naphthol, 1-[N'-(2'-β-chloroethylsulfonylethyl)ureido]-4,6-disulfo-8-naphthol, 2-[N'-(3'-β-sulfatoethylsulfonylphenyl)ureido]-6-sulfo-8-naphthol, 2-[N'-(2'-β-chloroethylsulfonylethyl)ureido]-6-sulfo-8-naphthol, 3-[N'-(3'-β-chloroethylsulfonylphenyl)ureido]-6-sulfo-8-naphthol and 3-[N'-(2'-vinylsulfonylethyl)ureido]-6-sulfo-8-naphthol.

Of particular importance thereamong are sulfo-containing coupling components which may carry azo groups, say 1 or 2 azo groups, and which couple in the o- or p-position relative to a hydroxyl and/or amino group, for example 2-acetylamino-5-hydroxynaphthalene-7-sulfonic acid, 2-acetylamino-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid or 1-benzoylamino-8-hydroxynaphthalene-4,6-disulfonic acid.

Pyrazolone coupling components are for example 3-methyl-, 3-carboxy- and 3-(C₂-C₅-alkoxycarbonyl)-5-pyrazolones which carry in the 1-position hydrogen, unsubstituted or methyl-, ethyl-, fluorine-, chlorine-, bromine-, trifluoromethyl-, methoxy-, ethoxy-, cyano-, phenoxy-, phenylsulfonyl-, methylsulfonyl-, sulfo-, benzoyl-, acetyl-, acetylamino-, nitro-, hydroxyl-, carboxyl-, carbamoyl- and/or sulfamoyl-substituted phenyl or sulfo-substituted 1- or 2-naphthyl, for example: 1-(2'-methoxy-5'-methylphenyl)-, 1-(2'-chloro-5'-sulfophenyl)-, 1-(2'-methoxy-5'-sulfophenyl)-, 1-(2'-methyl-4'-sulfophenyl)-, 1-(2',5'-dichloro-4'-sulfophenyl)-, 1-(2',5'-disulfophenyl)-, 1-(2'-carboxyphenyl)-, 1-(3'-sulfophenyl)-, 1-(4'-sulfophenyl)-, 1-(3'-sulfamoylphenyl)-3-carboxy-5-pyrazolone, 1-(3'- or 4'-sulfophenyl)-, 1-(2'-chloro-4'- or -5'-sulfophenyl)-, 1-(2'-methyl-4'-sulfophenyl)-, 1-(4',8'-disulfo-2'-naphthyl)- and 1-(6'-sulfo-1'-naphthyl)-3-methyl-5-pyrazolone, ethyl 1-phenyl-5-pyrazolone-3-carboxylate, ethyl 5-pyrazolone-3-carboxylate, 5-pyrazolone-3-carboxylic acid, 1-[4'-(β-sulfatoethylsulfonyl)-2'-sulfo]-phenyl-3-methylpyrazol-5-one, 1-[4'-(β-sulfatoethylsulfonyl)]-phenyl-3-carboxypyrazol-5-one, 1-[4'-(β-sulfatoethylsulfonyl)]-phenyl-3-methylpyrazol-5-one, 1-[3'-(β-sulfatoethylsulfonyl)]-phenyl-3-carboxypyrazol-5-one, 1-[3'-(β-sulfatoethylsulfonyl)]-phenyl-3-methylpyrazol-5-one and 1-(4'-sulfophenyl)-3-carboxypyrazol-5-one.

Pyridone coupling components are for example 1-ethyl-2-hydroxy-4-methyl-5-carboxamido-6-pyridone, 1-(2'-hydroxyethyl)-2-hydroxy-4-methyl-5-carboxamido-6-pyridone, 1-(4'-sulfophenyl)-2-hydroxy-4-methyl-5-carboxamido-6-pyridone, 1-(2'-sulfoethyl)-2-hydroxy-4-methyl-5-cyano-6-pyridone, 1-ethyl-2-hydroxy-4-sulfomethyl-5-carboxamido-6-pyridone, 1-ethyl-2-hydroxy-4-methyl-5-sulfomethyl-6-pyridone, 1-methyl-2-hydroxy-4-methyl-5-cyano-6-pyridone, 1-methyl-2-hydroxy-5-acetyl-6-pyridone, 1,4-dimethyl-2-hydroxy-5-cyano-6-pyridone, 1,4-dimethyl-2-hydroxy-5-carboxamido-6-pyridone, 2,6-dihydroxy-4-ethyl-5-cyanopyridine, 2,6-dihydroxy-4-ethyl-5-carboxamidopyridine, 1-ethyl-2-hydroxy-4-methyl-5-sulfomethyl-6-pyridone, 1-methyl-2-hydroxy-4-methyl-5-methylsulfonyl-6-pyridone, 1-carboxymethyl-2-hydroxy-4-ethyl-5-phenylsulfonyl-6-pyridone and 1-(2'-sulfoethyl)-2-hydroxy-4-carboxy-6-pyridone, and acetoacetylarylamide coupling components are for example acetoacetyl(2-methoxy-4-sulfo-5-methyl)-aniline, acetoacetyl-(2,4-dimethoxy-5-methyl)-aniline and acetoacetyl-(4-β-sulfatoethylsulfonyl)-aniline.

Further suitable coupling components H—K are in particular: 1-amino-8-hydroxynaphthalene-3,6- and -4,6-disulfonic acid and their acid coupling arylazo products of the formula (9a).

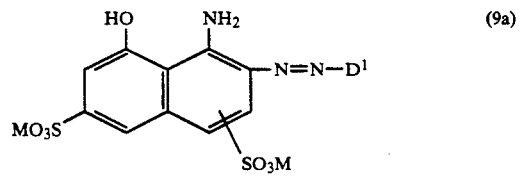

in which

D¹ may be the radical of a diazo component, for example a radical of the formula (10a) or (10b)

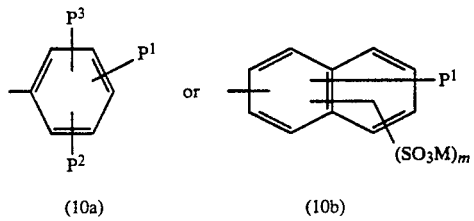

$P^1$, $P^2$, $P^3$ M and m have the abovementioned meanings.

Individual radicals D in the formula (9a) are for example: phenyl, 2-sulfophenyl, 3-sulfophenyl, 4-sulfophenyl, 2,4-disulfophenyl, 2,5-disulfophenyl, 3,5-disulfophenyl, 1,5-disulfonaphth-2-yl, 4,8-disulfonaphth-2-yl, 3,6,8-trisulfonaphth-2-yl, 4,6,8-trisulfonaphth-2-yl, 3,6,8-trisulfonaphth-1-yl, 4,6,8-trisulfonaphth-1-yl, 4-sulfonaphth-1-yl, 1-sulfonaphth-2-yl, 3-acetylaminophenyl, 4-acetylaminophenyl, 4-acetylamino-2-sulfophenyl, 5-acetylamino-2-sulfophenyl, 4-nitrophenyl, 4-nitro-2-sulfophenyl, 6-acetylamino-4,8-disulfonaphth-2-yl, 4-(β-sulfatoethylsulfonyl)-phenyl, 3-(β-sulfatoethylsulfonyl)-phenyl and 6-(β-sulfatoethylsulfonyl)-naphthyl-2-yl.

Coupling components which according to the present invention contain the fiber-reactive group of the formula (2) or into which the fiber-reactive group may be introduced, possibly after a coupling reaction first, are for example compounds of the formulae (11a) to (11j) and their Z°-free precursors:

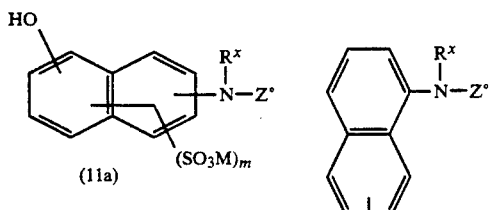

(11a)    (11b)

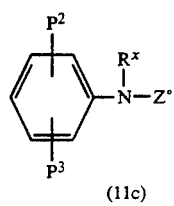

(11c)

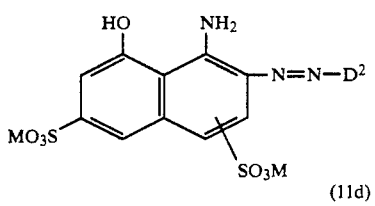

(11d)

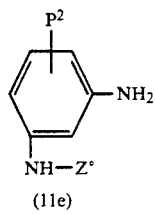

(11e)

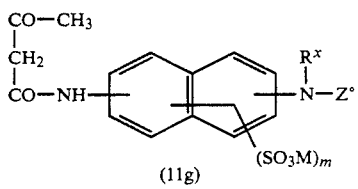

(11f)

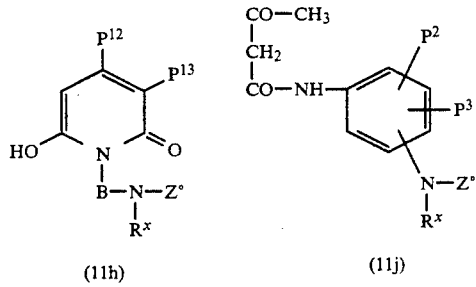

(11g)

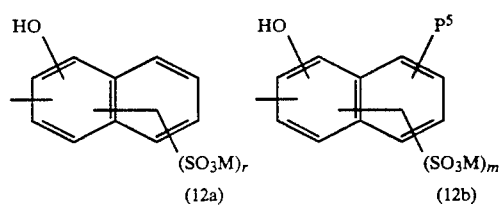

(11h)    (11j)

in which $R^x$, $P^2$, $P^3$, $P^{10}$, $P^{12}$, $P^{13}$, $D^2$, M, m and T have the above-mentioned, in particular the preferred, meanings, B is alkyl of 1 to 4 carbon atoms, benzyl, phenethyl or phenyl, or benzyl, phenethyl or phenyl which are each substituted in the benzene ring by fluorine, chlorine, bromine, methyl, methoxy, cyano, sulfo, carboxyl, acetyl, nitro, carbamoyl and/or sulfamoyl, in the case of "benzyl" and "phenethyl" the group —N($R^x$)—Z° being bonded to the benzene ring, Z° is a radical of the formula (2A)

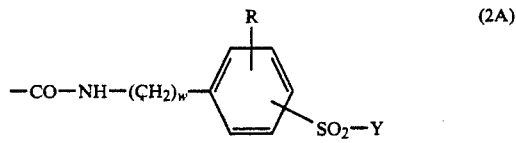

where R, w and Y have the abovementioned meanings, $D^2$ is the radical of a diazo component having a fiber-reactive group, in particular of the formula (2), for example a radical of the formula (10c)

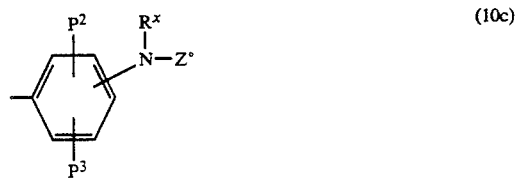

in which $R^x$, $P^2$, $P^3$ and Z° have the abovementioned, in particular the preferred, meanings, or is a radical of the abovementioned formula (10a) or (10b) where P is a group of the formula —$SO_2$—Y.

Aromatic diamines from which the radical (10c) may be derived are for example: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid and 1,5-diamino-4-methoxybenzene-2-sulfonic acid, in each of these diamino compounds one of the amino groups being substituted by the fiber-reactive radical Z°.

Radicals K in the formulae (3b) and (4a) which do not contain the group Z are in particular radicals of the formulae (12a) to (12h)

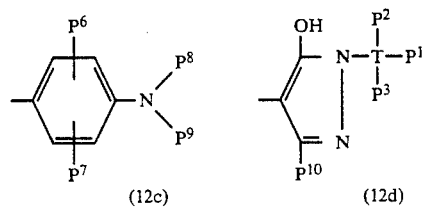

(12a)    (12b)

(12c)    (12d)

-continued

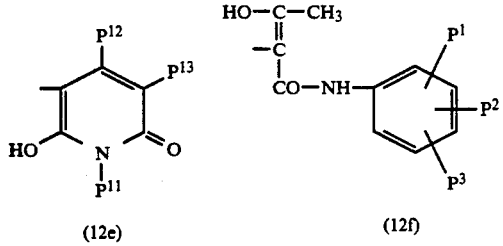

(12e) (12f)

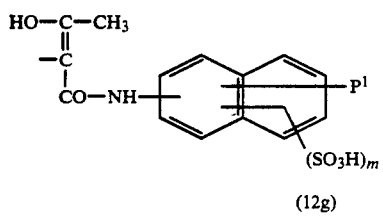

(12g)

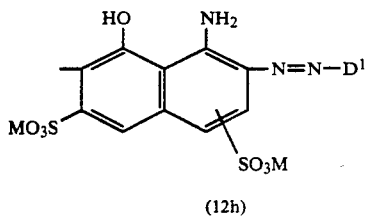

(12h)

in which the individual variables have the abovementioned meanings.

Radicals K in the formulae (3a), (3c) and (4a) which contain the group Z are therefore in particular radicals of the formula (12j) to (12q)

(12j) (12k)

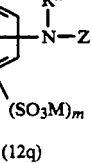

(12m)

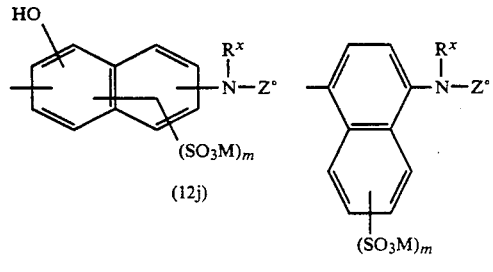

(12n)

-continued

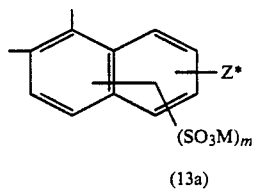

(12o) (12p)

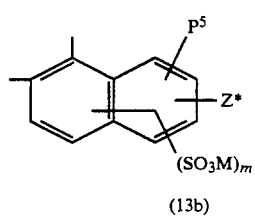

(12q)

in which the individual variables have the abovementioned meanings.

Radicals K in the formula (4c) which contain a metal-complexing oxygen atom and which may contain the group Z are in particular those of the formulae (13a) to (13f)

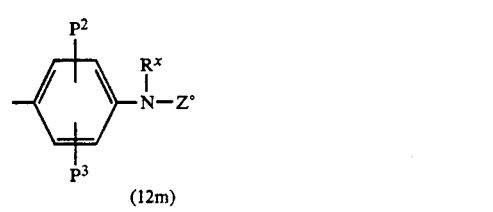

(13a)

(13b)

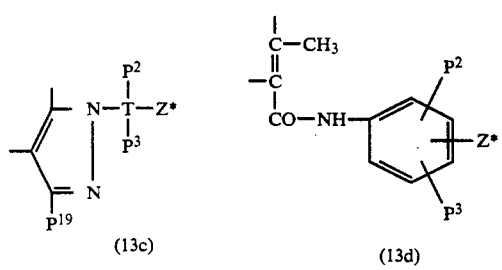

(13c) (13d)

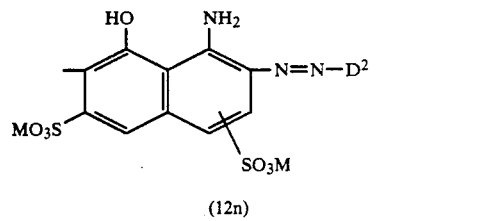

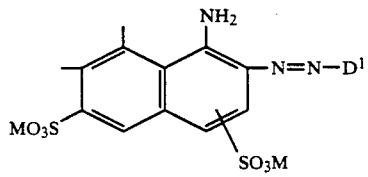

(13e)

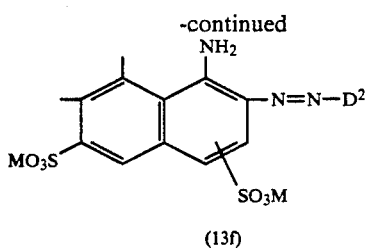

(13f)

in which Z* has one of the meanings of $P^1$ or Z and the variables have one of the abovementioned meanings.

The abovementioned coupling components of the formulae (11a) and (11d) to (11j) can be prepared from their Z°-free starting compounds, i.e. those amino starting compounds which contain the group $-N(R^x)-H$ instead of the group $-N(R^x)-Z°$ by reaction with an isocyanate compound of the below-indicated formula (56). By contrast, the compounds of the formula (11b) and (11c) are themselves not useful as coupling components. They must be used as coupling components in the form of their Z°-free amino compounds; after the coupling reaction, the fiber-reactive radical Z° can be introduced into the azo compound thus formed by reaction with a compound of the formula (56). This method can also be adopted in the case of the Z°-free amino starting compounds of the compounds (11a) and (11d) to (11j).

Of the anthraquinone dyes according to the present invention, preference is given to those which conform to the formula (14a)

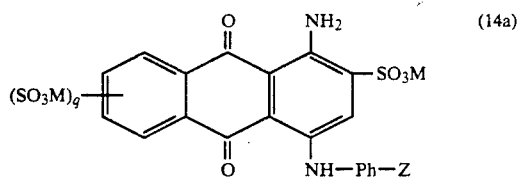

in which
M is a hydrogen atom or an alkali metal, such as sodium, potassium or lithium,
q is zero or 1 (this group being a hydrogen atom in the case of q being zero),
Ph is a phenylene radical which may be substituted by 1 or 2 substituents selected from the group consisting of alkyl of 1 to 4 carbon atoms, such as methyl and ethyl, alkoxy of 1 to 4 carbon atoms, such as methoxy and ethoxy, halogen, such as chlorine and bromine, carboxyl and sulfo, and
Z is the fiber-reactive group of the formula (2).

Of the triphendioxazine dyes according to the present invention, preference is given to those which conform to the formula (14b)

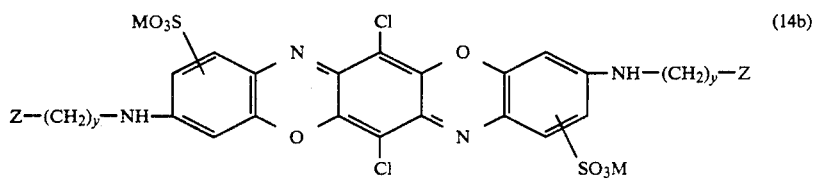

in which M is a hydrogen atom or an alkali metal, such as sodium, potassium or lithium, Z is the fiber-reactive group of the formula (2), Y is 2, 3 or 4, and the two sulfo groups $-SO_3M$ are preferably bonded to the benzene ring in the ortho-position relative to the oxygen atom of the heterocyclic ring.

Of the phthalocyanine dyes according to the present invention, preference is given to those which conform to the formula (14c)

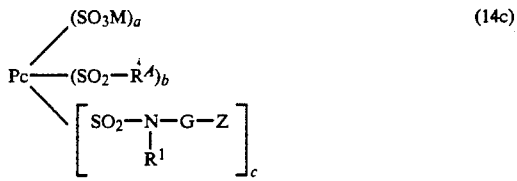

in which
Pc is the radical of a copper or nickel phthalocyanine;
$R^4$ is an amino group of the formula $-NR^2R^3$, in which $R^2$ and $R^3$ are each independently of the other a hydrogen atom or an alkyl group of 1 to 4 carbon atoms which may be substituted by hydroxyl or sulfo, or is a heterocyclic, N-containing radical such as morpholino or piperidino;
$R^1$ is a hydrogen atom or an alkyl group of 1 to 4 carbon atoms, such as methyl or ethyl;
G is a phenylene radical which may be substituted by 1 or 2 substituents selected from the group consisting of alkyl of 1 to 4 carbon atoms, such as ethyl and methyl, halogen, such as chlorine and bromine, carboxyl and sulfo, for example a carboxyphenylene or sulfophenylene radical, or is an alkylene group of 2 to 6 carbon atoms, such as ethylene, or a phenylene-alkylene radical whose phenylene may be substituted as specified above and whose alkylene moiety is an alkylene of 1 to 4 carbon atoms;
Z is the fiber-reactive group of the formula (2);
a is a number from 2 to 3,
b is a number from zero to 3, and
c is a number from 1 to 2,
the sum total of (a+b+c) being equal to a number from 3 to 4.

Of the copper formazan dyes according to the present invention, preference is given to those which conform to the formula (14d)

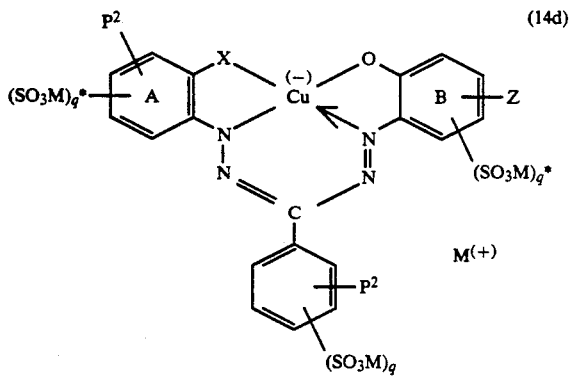

(14d)

in which
X is the oxy group of the formula —O— or preferably the carbonyloxy group of the formula —CO—O—;

q* is zero or 1 (this group being hydrogen in the case of q* being zero);

$P^2$, M, m, q and Z have the abovementioned, in particular the preferred, meanings.

Of the copper formazan dyes of the formula (14d), preference is given in particular to those in which $P^2$ is in each case hydrogen, q is zero, q* is 1, the sulfo group attached to the benzene ring A being in this case bonded in the para-position relative to the group X and the sulfo group bonded to the benzene ring B being attached para to the oxy group, and Z is a group of the formula —NH—Z° where the Z° has the abovementioned meaning and where within Z° the group —SO$_2$—Y is preferably attached to the benzene ring in the para-position and Y is preferably a β-chloroethyl group, R is preferably a hydrogen atom and w is preferably 2, and this group —NH—Z° is preferably bonded to the benzene ring B in the ortho-position relative to the oxy group.

Of the azo dyes, preference is further given to those which conform to the formulae (15a) to (15j), (16a) and (16b):

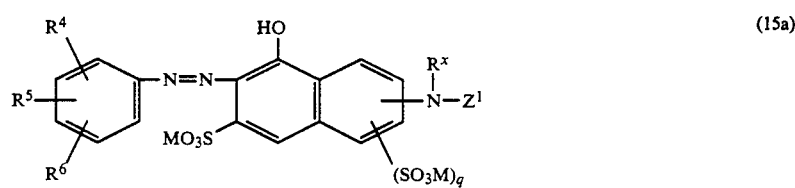

(15a)

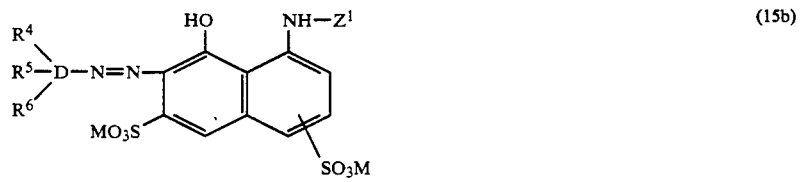

(15b)

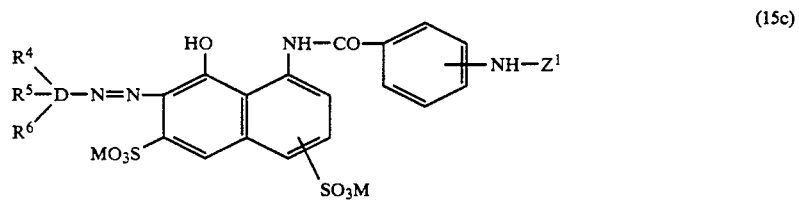

(15c)

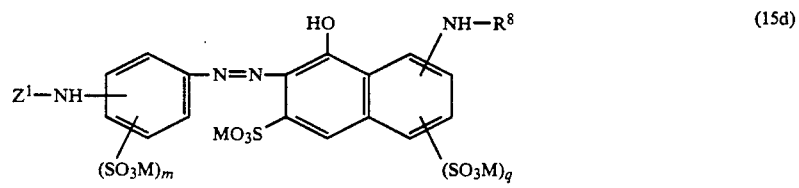

(15d)

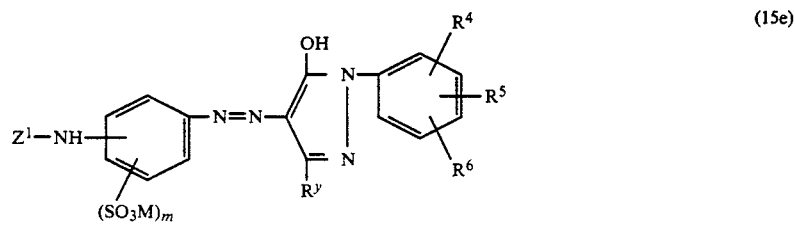

(15e)

-continued

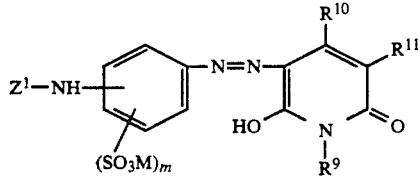
(15f)

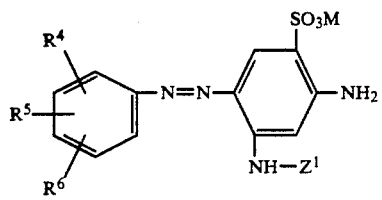
(15g)

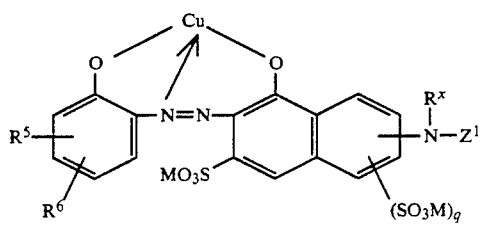
(15h)

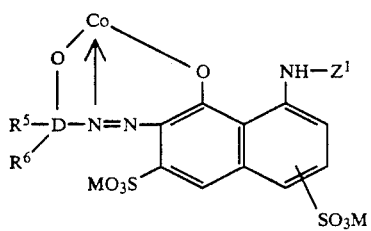
(15j)

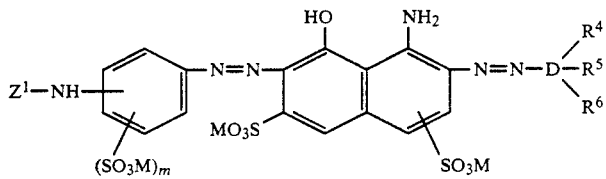
(16a)

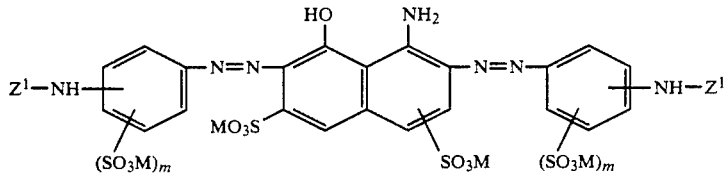
(16b)

in which

M has one of the abovementioned meanings;

$R^x$ is hydrogen or alkyl of 1 to 4 carbon atoms, such as methyl, preferably hydrogen;

$R^4$ is hydrogen, alkyl of 1 to 4 carbon atoms, such as ethyl or in particular methyl, alkoxy of 1 to 4 carbon atoms, such as ethoxy or in particular methoxy, halogen, such as chlorine or bromine, carboxyl or sulfo;

$R^5$ is hydrogen, alkyl of 1 to 4 carbon atoms, such as ethyl or in particular methyl, alkoxy of 1 to 4 carbon atoms, such as ethoxy or in particular methoxy, halogen, such as chlorine or bromine, carboxyl or sulfo;

$R^6$ is hydrogen, sulfo, $\beta$-sulfatoethylsulfonyl, $\beta$-chloroethylsulfonyl, or vinylsulfonyl;

$Z^1$ is a group of the formula (2A) or preferably a group of the formula (2B)

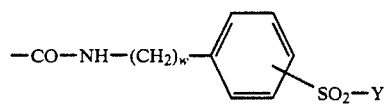
(2B)

where w is 1 or 2, preferably 2, Y has one of the abovementioned, in particular the preferred, meanings and the group —$SO_2$—Y is bonded to the benzene ring in the meta- or para-position;

D is a benzene ring or is a naphthalene ring to which the azo group is bonded in the $\beta$-position, if the latter $R^4$ and $R^5$ preferably each being independently of the other a hydrogen atom or a sulfo group;

m is zero, 1 or 2 (this group being a hydrogen atom in the case of m being zero);

q is zero or 1 (this group being a hydrogen atom in the case of m being zero);

$R^7$ is an alkanoyl group of 2 to 5 carbon atoms, such as acetyl, benzoyl, a β-sulfatoethylsulfonyl or a 3-(β-chloroethylsulfonyl)benzoyl group;

$R^8$ is an alkyl group of 2 to 5 carbon atoms, such as acetyl, or a benzoyl group;

$R^Y$ is methyl or carboxyl;

$R^9$ is hydrogen or an alkyl group of 1 to 4 carbon atoms, such as methyl or ethyl, which may be substituted by a sulfo or carboxyl group, or is a phenyl radical;

$R^{10}$ is a hydrogen atom or an alkyl group of 1 to 4 carbon atoms, such as methyl, or a phenyl radical;

$R^{11}$ is a hydrogen atom or a cyano, carbamoyl, sulfamoyl or sulfomethyl group.

Further preferred dyes conforming to the formula (1) according to the present invention are those of the following formulae (17) to (31):

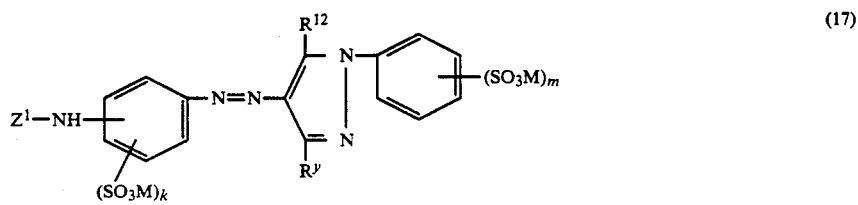

(17)

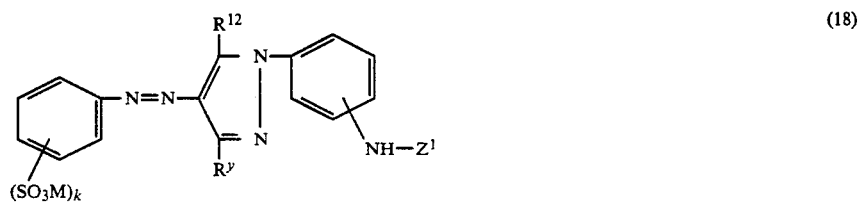

(18)

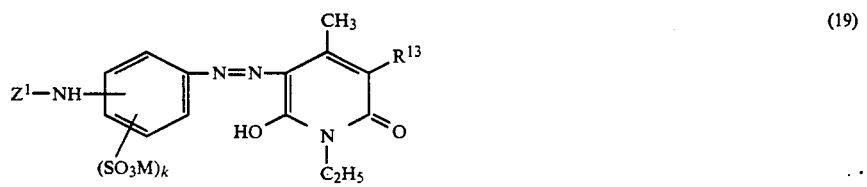

(19)

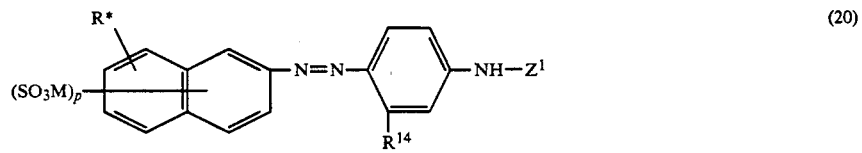

(20)

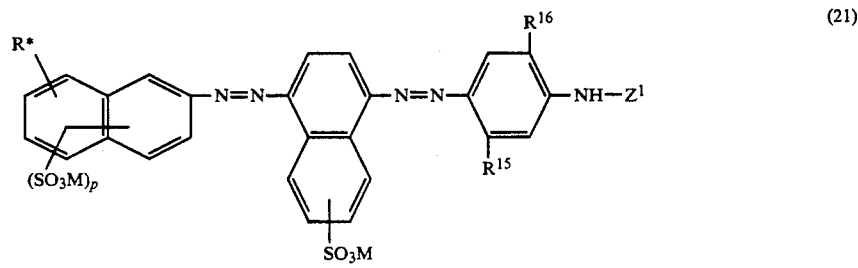

(21)

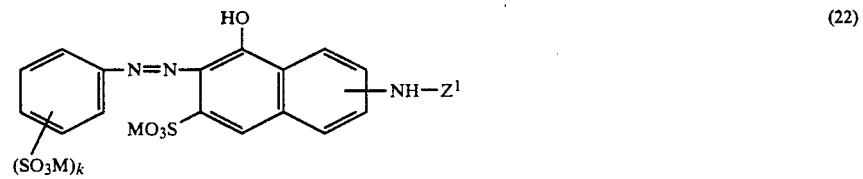

(22)

-continued
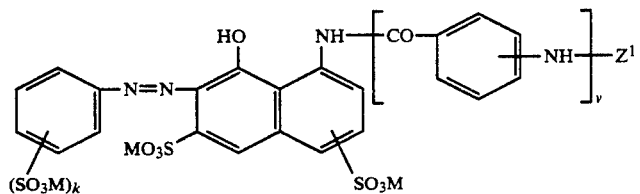 (23)
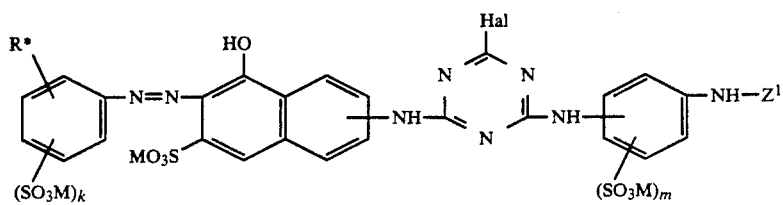 (24)
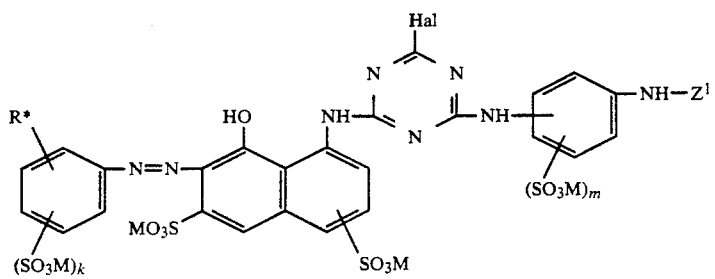 (25)
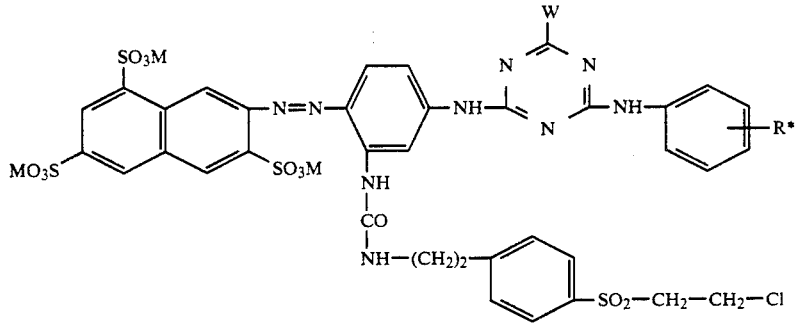 (25a)
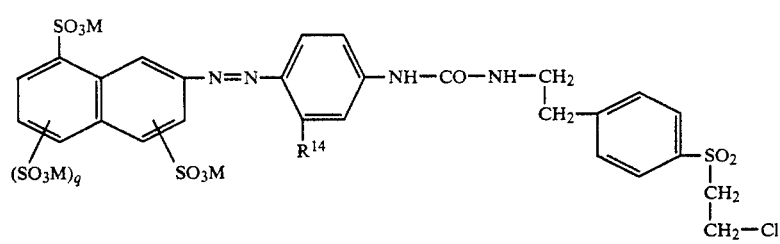 (25b)
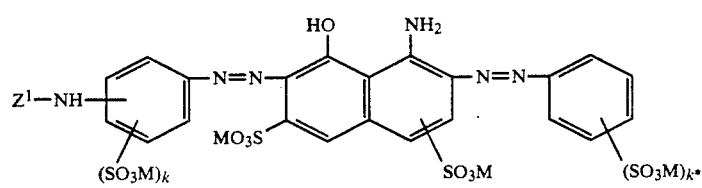 (26)
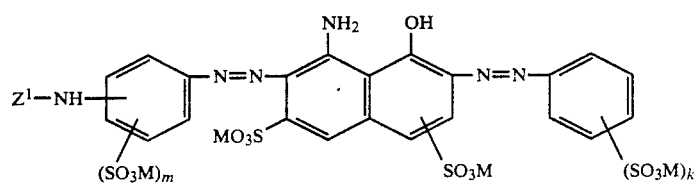 (27)

-continued
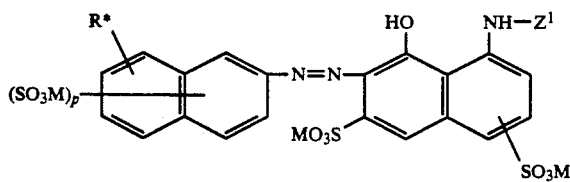 (28)
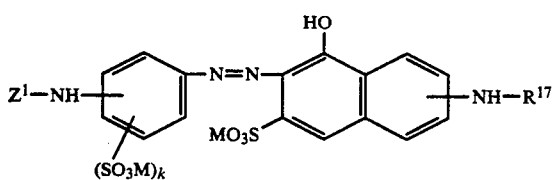 (29)
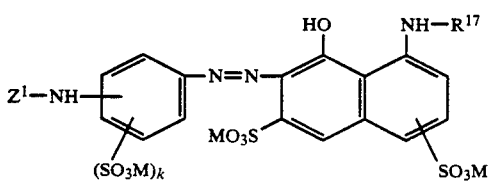 (30)
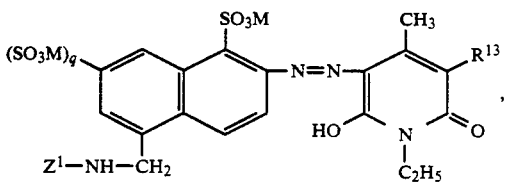 (31)
also the metal complex dyes, such as the 1:2 chromium and 1:2 cobalt and in particular the 1:1 copper complex dyes of the compounds of the formulae (32) to (37):
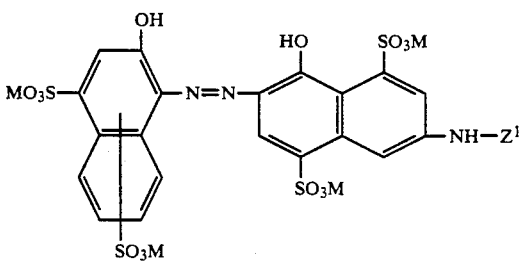 (32)
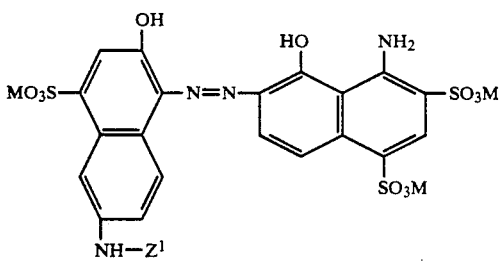 (33)
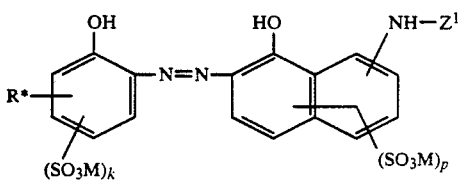 (34)

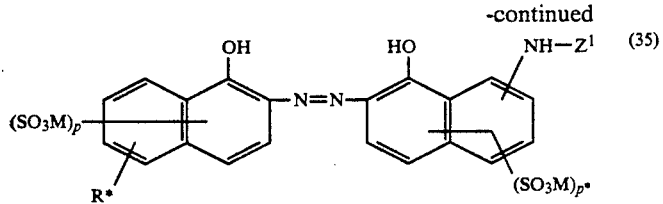
(35)
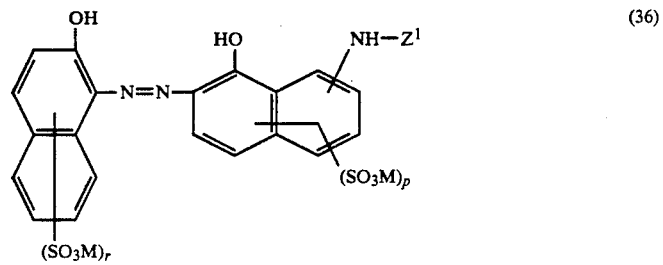
(36)
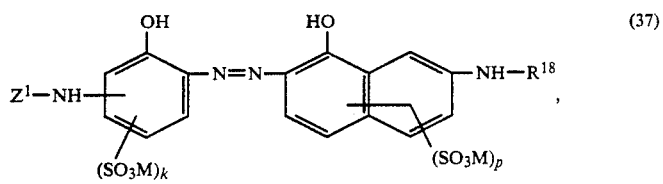
(37)
also the dyes of the formulae (38) to (54):
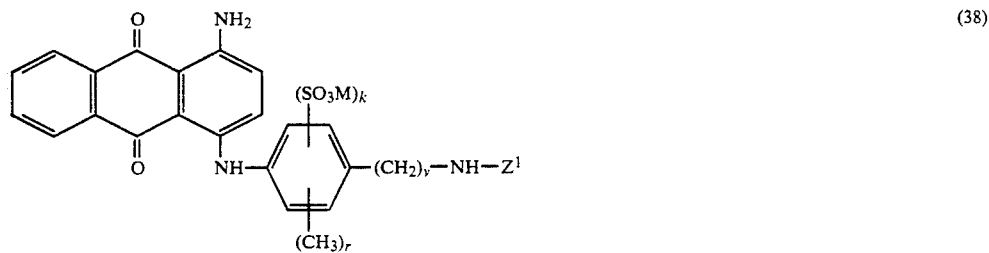
(38)
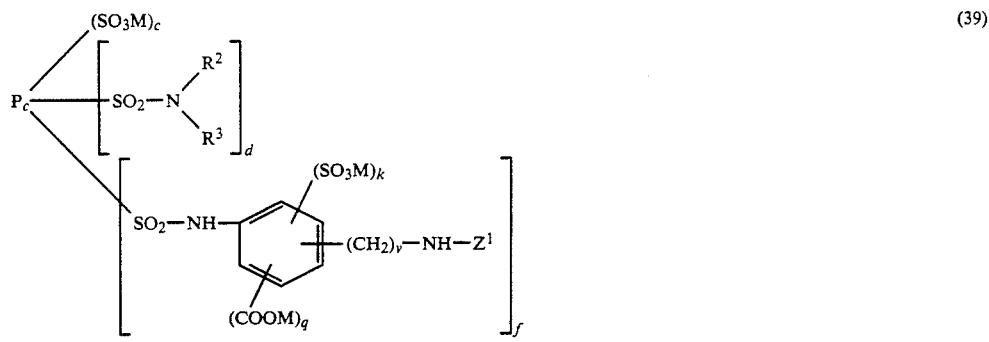
(39)
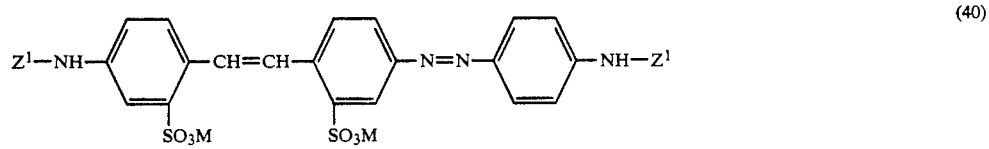
(40)
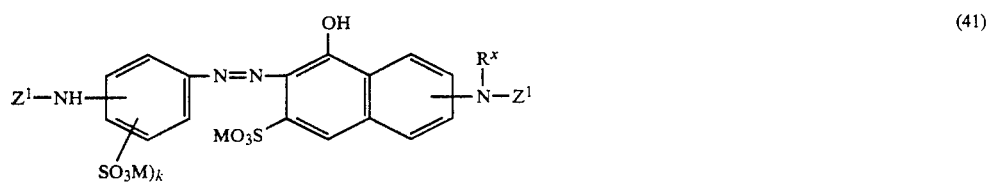
(41)

-continued
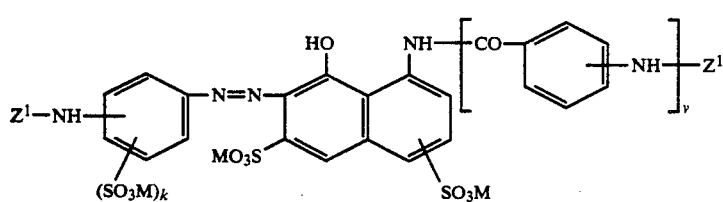
(42)
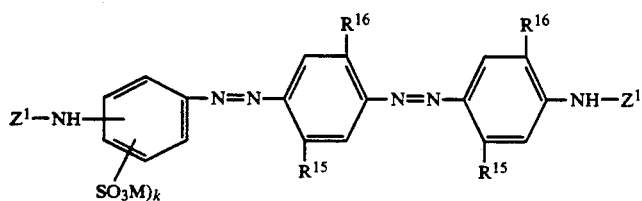
(43)
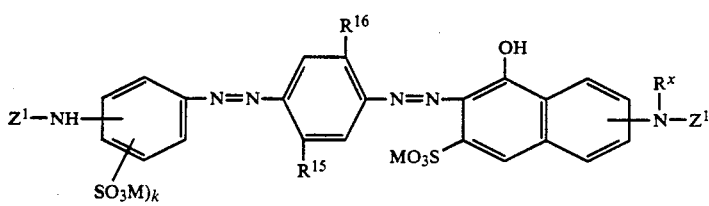
(44)
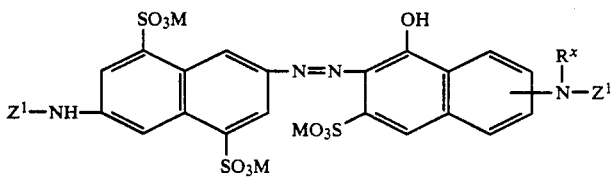
(45)
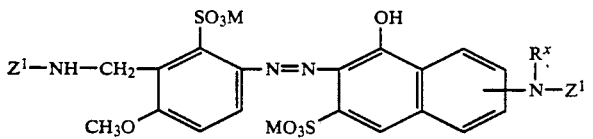
(46)
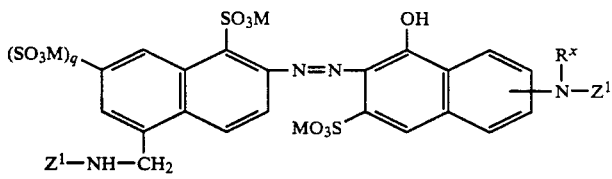
(47)
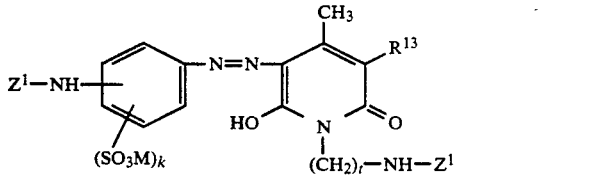
(48)
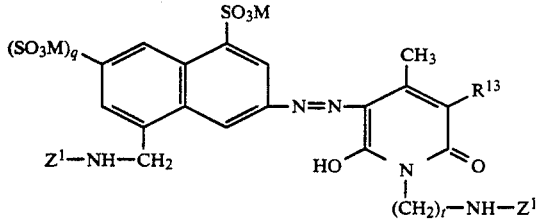
(49)

-continued

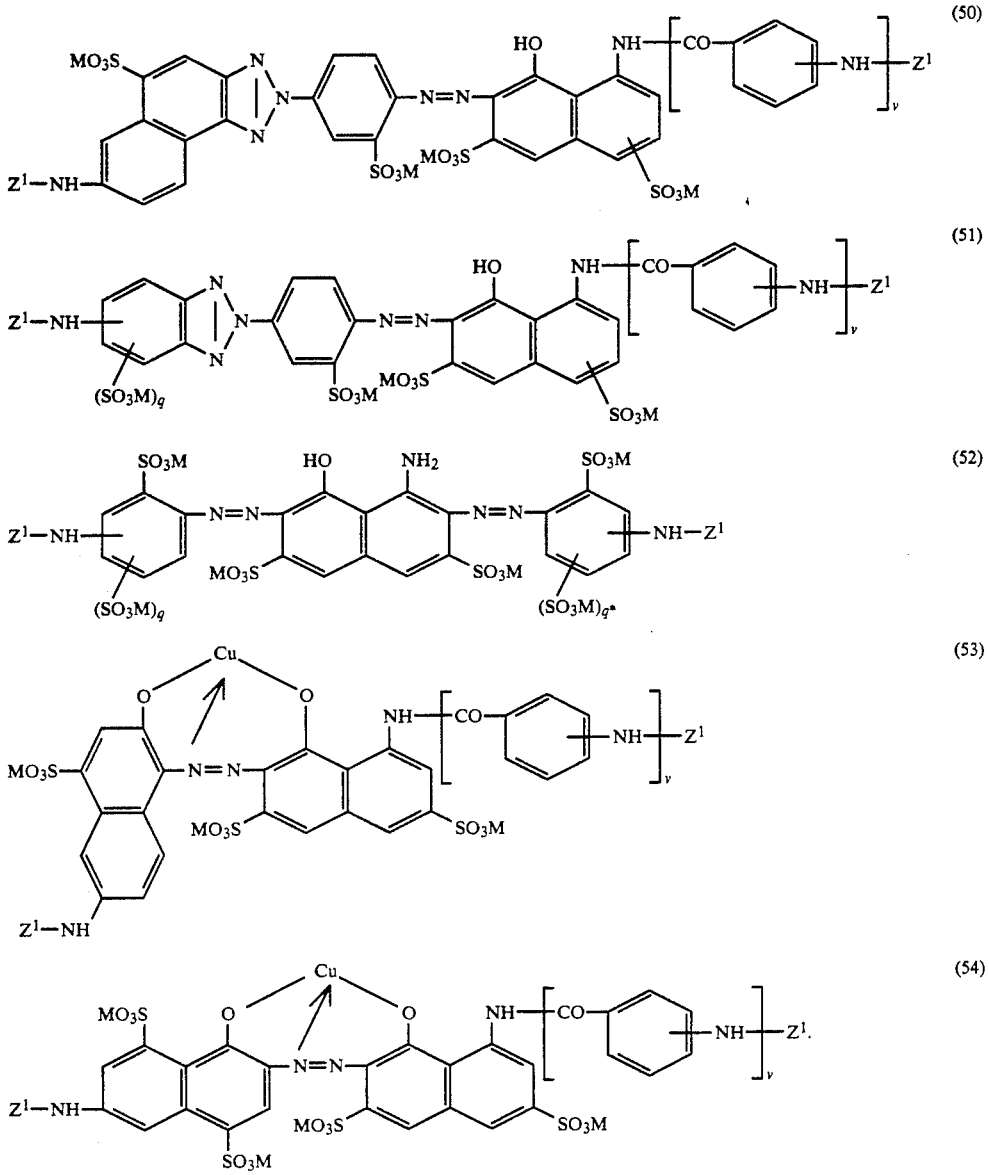

In these formulae,

M, m, $Z^1$ and $R^Y$ have the abovementioned meanings;

R* is sulfo, vinylsulfonyl, β-chloroethylsulfonyl or β-sulfatoethylsulfonyl;

k is 1 or 2, preferably 1;

k* is 1 or 2;

$R^{12}$ is hydroxyl or amino;

$R^{13}$ is cyano, carbamoyl or sulfomethyl;

$R^{14}$ is methyl, acetylamino or ureido;

p is 1, 2 or 3;

p* is 1, 2 or 3;

$R^{15}$ is a hydrogen atom or an alkyl group of 1 to 4 carbon atoms, such as methyl or ethyl, an alkoxy group of 1 to 4 carbon atoms, such as methoxy or ethoxy, an alkanoylamino group of 2 to 5 carbon atoms, such as acetylamino, ureido or a halogen atom, such as bromine and in particular chlorine, but preferably a hydrogen atom or a methyl, ethyl, methoxy, ethoxy, acetylamino or ureido group or a chlorine atom;

$R^{16}$ is a hydrogen atom or an alkyl group of 1 to 4 carbon atoms, such as methyl or ethyl, an alkoxy group of 1 to 4 carbon atoms, such as methoxy or ethoxy, or a halogen atom, such as bromine or in particular chlorine, but preferably a hydrogen atom, a methyl, ethyl, methoxy or ethoxy group or a chlorine atom;

v is zero or 1;

Hal is chlorine or fluorine;

W is chlorine, fluorine or cyanamido;

$R^{17}$ is acetyl or benzoyl;

$R^{18}$ is hydrogen or acetyl;

r is zero or 1, 2 or 3 (this group being hydrogen in the case of r being zero);

$R^2$ is a hydrogen atom or an alkyl of 1 to 4 carbon atoms, such as methyl or ethyl; and $R^3$ is a hydrogen atom or an alkyl group, such as methyl or ethyl; or $R^2$ and $R^3$ together with the nitrogen atom and one or two alkylene groups of 2 to 5 carbon atoms and optionally a nitrogen or oxygen atom or a group —NH— form a heterocyclic radical, for example the piperidino or morpholino radical;

q is zero or 1 (this group being a hydrogen atom in the case of q being zero);

q* is zero or 1 (this group being a hydrogen atom in the case of q* being zero);

Pc is the radical of the copper or nickel phthalocyanine;

c is a number from 1 to 3, d is a number from 0.5 to 1.5 and f is a number from 1 to 2, the sum total of (c+d+f) being a number from 3 to 4;

$R^x$ is a hydrogen atom or an alkyl group of 1 to 4 carbon atoms, such as methyl;

t is 2 or 3;

the benzene rings indicated in the above dye formulae may additionally be further substituted, for example by 1 or 2 substituents selected from the group consisting of methyl, ethyl, methoxy, ethoxy, methylsulfonyl, ethylsulfonyl, carboxyl, acetylamino and chlorine, and the naphthalene rings by a substituent selected from the group consisting of methoxy, carboxyl, acetylamino, nitro and chlorine.

In all the above formulae, the individual variables, irrespectively of whether they bear the same or different designations within any one formula, may be identical to or different from one another within the limitations of their meaning.

The terms "sulfo", "carboxyl", "phosphato", "thiosulfato" and "sulfato" imply not only the acid form but also the salt form of these groups. Accordingly, sulfo denotes groups conforming to the formula $-SO_3M$, carboxyl denotes groups conforming to the formula $-COOM$, phosphato denotes groups conforming to the formula $-OPO_3M_2$, thiosulfato denotes groups conforming to the formula $-S-SO_3M$ and sulfato denotes groups conforming to the formula $-OSO_3M$, in each case with M of the abovementioned meaning.

The present invention also provides processes for preparing the dyes of the formula (1) according to the present invention. They can be prepared in a generally conventional manner by methods similar to known synthesis routes specific for the particular dye class by reacting precursors typical of the particular dye, in which at least one contains a group of the formula (2), with one another or by starting from an amino-containing starting component of the formula (55)

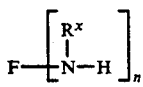

(55)

in which F, $R^x$ and n have the abovementioned meanings, and reacting it with an isocyanate compound of the formula (56)

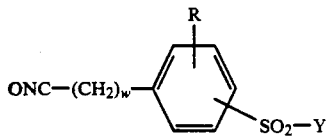

(56)

in which w, R and Y have the abovementioned meanings, in a manner similar to known procedures for reacting isocyanate compounds with amino compounds (see for example Houben-Weyl, "Methoden der Organischen Chemie", volume 8, 4th edition (1952), pages 156–162, and volume E 3 (1983), pages 338, 339 and 352–359), or by reacting a compound of the formula (57)

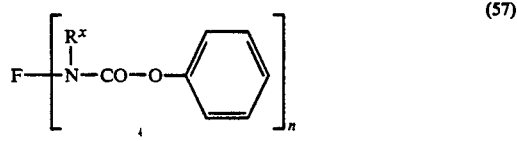

(57)

in which F, $R^x$ and n have the abovementioned meanings, with an amino compound of the formula (58)

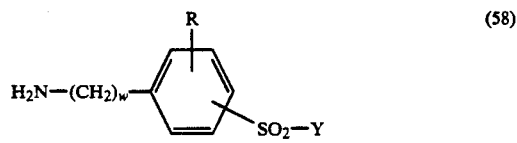

(58)

in which w, R and Y have the abovementioned meanings.

Phthalocyanine dyes according to the present invention can be prepared according to the present invention for example by starting from a phthalocyaninesulfonyl chloride or a sulfo-containing phthalocyaninesulfonyl chloride, reacting it with a diamino compound and optionally with a further amine, for example an amine of the formula $HNR^2R^3$ where $R^2$ and $R^3$ have the abovementioned meanings, and reacting the resulting $-N(R^x)H$-containing reaction product with an isocyanate of the formula (56). The procedures for reacting phthalocyaninesulfonyl chlorides with amines are known in large numbers from the literature, for example from U.S. Pat. No. 4,745,178 and the references cited therein in respect of this matter.

The starting compounds of the formula (57) can be prepared in a conventional manner (see for example Houben-Weyl, loc. cit., volume 8, pages 119–123, and volume E4, pages 738–746 and 749–751) by reacting an amino-containing starting dye of the formula (5), where F, $R^x$ and n have the abovementioned meaning, with phenyl chloroformate.

In the first-mentioned synthesis process according to the present invention involving the reaction of precursors of which at least one contains a group of the formula (2), such precursors are for example, the diazo components conforming to the formula $Z-D_1-NH_2$ and $Z-D_2-NH_2$ and also $Z-D-NH_2$ where D, $D_1$, $D_2$ and Z have the abovementioned, in particular the preferred, meanings and also the coupling components of the formula $H-K-Z$ where K and Z have the abovementioned, in particular the preferred, meanings. These starting diazo and coupling components can be synthesized in a similar manner to known procedures of reacting isocyanate compounds with amino compounds by reacting the corresponding starting amino compounds of the formulae $H_2N-D-N(R^x)H$ or $H_2N-D_1-N(R^x)H$ or $H_2N-D_2-N(R^x)H$ or $H_2N-K-N(R^x)H$ with an isocyanate compound of the formula (56j). The reaction is carried out in a similar manner to known procedures of reacting amino compounds with isocyanates (see Houben-Weyl, loc. cit.). More particularly, the reaction is carried out at a temperature between 0° and 70° C., preferably between 15° and 30° C., and at a pH between 1 and 7, preferably at a pH between 4 and 7. The general procedure is to combine the isocyanate compound of the formula (56) dissolved in an organic solvent which is inert towards isocyanate, for example chlorobenzene, and the amino-containing starting diazo components and coupling components in aqueous solution under the abovementioned reaction conditions, for example by vigorously stirring these two phases together. After the reaction has ended, the batch is worked up in a manner known to those skilled in the art. In general, the urea compound formed is in solution in the aqueous phase, so that the organic phase can be separated off and discarded.

The reaction of the amino-containing starting compounds of the formula (55) with an isocyanate compound of the formula (56) is carried out in a similar manner to that described above for the starting materials. More particularly, the reaction is carried out at a temperature between 0° and 50° C., preferably between 10° and 30° C., and at a pH between 2 and 7, preferably between 4 and 6, again the isocyanate compound being used dissolved in an organic solvent inert towards isocyanate and the starting compound (55) being used in aqueous solution.

The reaction between the compounds of the formula (57) and the compounds of the formula (58) according to the present invention takes place in aqueous solution at a temperature between 0° and 60° C., preferably between 30° and 50° C., and at a pH between 4 and 7.

The isocyanate starting compound of the formula (56) is obtained in a manner similar to known procedures, for example by reacting amino compounds of the formula (58), or salts thereof, such as hydrochlorides, with phosgene. Such starting compounds of the formula (58) are for example β-(4-β'-chloroethylsulfonylphenyl)ethylamine, β-(3-β'-chloroethylsulfonylphenyl)ethylamino, 3- or 4-(β-chloroethylsulfonyl)benzylamine, 4-(β-chloroethylsulfonyl)-2-methoxybenzylamine, 3-(β-chloroethylsulfonyl)-6-methoxybenzylamine, 4-(β-chloroethylsulfonyl)-2-chlorobenzylamine, 3-(β-chloroethylsulfonyl)-6-chlorobenzylamine, γ-(4-β'-chloroethylsulfonyl-2-methoxyphenyl)ethylamine, β-(3-β'-chloroethylsulfonyl-6-methoxyphenyl)ethylamine, γ-(4-β'-chloroethylsulfonyl-2-methoxyphenyl)propylamine and δ-(4-β'-chloroethylsulfonyl-2-methoxyphenyl)butylamine and salts thereof, such as hydrochlorides.

The starting compounds of the formula (58) and the synthesis thereof are known from the literature, for example from Offenlegungsschrift No. 3,628,090 and European Patent Application Publication No. 0 133 270A.

In the synthesis according to the present invention of azo dyes according to the present invention, where the starting materials are diazo and coupling components of which either one or both contain a group of the formula (2), the reaction takes place in the conventional manner of diazotization and coupling reactions, e.g. the diazotization in general at a temperature of between −5° C. and +50° C. and at a pH below 2 by means of a strong acid and alkali metal nitrite in a preferably aqueous medium and the coupling reaction in general at a pH between 1.5 and 4.5 in the case of an amino-containing coupling component and at a pH between 3 and 7.5 in the case of a hydroxyl-containing coupling component and at a temperature between 0° and 25° C., again preferably in an aqueous medium.

The synthesis according to the present invention of the heavy metal complex azo dyes according to the present invention may also proceed for example from those metal-free azo dyes which conform to the formula (1) but in which the diazo and coupling components each contain in the ortho position relative to the azo group a hydroxyl group capable of complexing. This o,o'-dihydroxy-azo starting compound conforming to the formula (1) is then reacted in a conventional and known manner with a heavy metal donor, for example copper chloride, copper sulfate, chromium chloride, chromium sulfate or cobalt chloride, to give the heavy metal complex azo dye according to the present invention.

Those compounds in which Y is vinyl can be prepared from their analogous ester derivatives by means of an alkali, for instance in an aqueous medium at a pH of from 10 to 12 and at a temperature between 30° and 50° C. in the course of from 10 to 20 minutes. The synthesis of for example β-(dialkylamino)ethylsulfonyl and β-thiosulfatoethylsulfonyl derivatives is effected by reacting their vinylsulfonyl compounds with the corresponding dialkylamine or with an alkali metal salt of thiosulfuric acid, such as sodium thiosulfate. All these procedures for converting a group $-SO_2-Y$ into another group are familiar to the person skilled in the field of fiber-reactive dyes and may be found in large numbers in the literature.

The dyes of the formula (1) according to the present invention are suitable for dyeing and printing a wide range of materials such as silk, leather, wool, polyamide fibers and polyurethanes, and in particular cellulose-containing fiber materials of any kind. Such fiber materials are for example the natural cellulose fibers, such as cotton, linen and hemp, but also pulp and regenerated cellulose. The dyes of the formula (1) are also suitable for dyeing or printing hydroxyl-containing fibers which are present in blended fabrics, for example blends of cotton with polyester fibers or polyamide fibers.

The dyes according to the present invention can be applied to the fiber material and fixed on the fiber in various ways, in particular in the form of aqueous dye solutions and print pastes. They are suitable not only for the exhaust method but also for dyeing by the pad-dyeing method whereby the textile material is impregnated with aqueous dye solutions, which may contain a salt, and the dye is fixed after an alkali treatment or in the presence of alkali, with or without heating. The dyes according to the present invention are particularly suitable for use in the so-called cold pad-batch process, whereby the dye is applied on a pad-mangle with the alkali and then fixed by several hours, storage at room temperature. After fixation, the dyeings or prints are thoroughly rinsed with cold and hot water, in the presence or absence of an agent which acts as a dispersant and promotes the diffusion of the unfixed portions. The present invention therefore also provides for the use of the compounds of the formula (1) according to the present invention for dyeing (including printing) these materials, or rather processes for dyeing (and printing) such materials in a generally conventional manner using a compound of the formula (1) as colorant by applying the compound of the formula (1) to the material in aqueous medium and fixing it on the material by means of heat or by means of an alkaline compound or both.

If anthraquinone dyes according to the present invention are insufficiently soluble in the alkaline dyeing liquor, this defect may be remedied by the literature method of adding dispersants or other uncolored compounds, for example a naphthalenesulfonic acid/formaldehyde condensate or in particular anthraquinone-2-sulfonic acid.

The dyes of the formula (1) are notable for high reactivity, good fixation and very good buildup. They can therefore be used in exhaust dyeing at low dyeing temperatures and require only short steaming times if used in pad-steam processes. The degrees of fixation are high, and the unfixed portions are readily washed off, the difference between the degree of exhaustion and degree of fixation being remarkably small; that is, the hydrolysis loss is very small. The dyes of the formula (1) are also suitable in particular for printing, especially on cotton, but also for printing nitrogen-containing fibers, for example wool or silk or blended fabrics containing wool or silk.

The dyeings and prints on cellulose fiber materials produced with the dyes according to the present invention possess a high color strength and a high fiber-dye bond stability not only in the acid but also in the alkali range and also a good lightfastness and very good wetfastness properties, such as wash, water, seawater, cross-dyeing and perspiration fastness properties, and also good fastness to dry heat setting and pleating and crocking.

The examples which follow illustrate the invention. Parts and percentages are by weight, unless otherwise stated. Parts by weight bear the same relation to parts by volume as the kilogram to the liter.

The compounds described in these examples by a formula diagram are shown in the form of the free acid; in general, they are prepared and isolated in the form of their alkali metal salts, such as lithium, sodium or potassium salts, and used for dyeing in the form of their salts.

Similarly, the starting compounds and components mentioned in the form of their free acids in the examples which follow, in particular the tabled examples, can be used in the synthesis as such or in the form of their salts, preferably alkali metal salts.

The absorption maxima ($\lambda_{max}$) in the visible region reported for the compounds according to the present invention were determined on aqueous solutions of alkali metal salts. In the tabled examples, their $\mu_{max}$ values are given in brackets after the hue; the wavelength unit is nm.

EXAMPLE A

Following is the description of the synthesis of β-[4-(β'-chloroethylsulfonyl)phenyl]ethyl isocyanate: 133 parts of β-[4-(β'-hydroxyethylsulfonyl)phenyl]ethylamine hydrochloride (known from German Offenlegungsschrift 3,628,090) are refluxed together with 300 parts by volume of thionyl chloride in the presence of 1 part of dimethylformamide for four hours. Excess thionyl chloride is then distilled off under reduced pressure, and the residue is finely dispersed in 1000 parts of chlorobenzene. 125 parts of phosgene are introduced at 90° to 100° C. in the course of 3 to 4 hours. A clear solution is obtained, which is blown phosgene-free with nitrogen and then decolorized with active charcoal. The isocyanate content of the solution is determined by titration with diisobutylamine.

The solution thus obtained contains about 116 parts of isocyanate compound; it can be used directly for synthesizing the dyes according to the present invention.

To confirm the structure of the abovementioned diisocyanate, a small sample is stirred together with an equivalent amount of aniline. The crystalline precipitate is recrystallized from ethanol. The structure of this compound, namely N-phenyl-N'-β-[4-(β'-chloroethylsulfonyl)phenyl]ethylurea, has been authentisized by NMR spectroscopy and elemental analysis

EXAMPLE B

A neutral solution of 19 parts of 1,3-diaminobenzene-4-sulfonic acid in 100 parts of water is admixed at 15° to 25° C. with a third of the isocyanate solution of Example A by vigorous stirring After the reaction, which may be monitored by chromatography, has ended, the chlorobenzene phase is separated off and discarded.

The aqueous solution of N-(3-amino-4-sulfophenyl)-N,-β-[4,-(β'-chloroethylsulfonyl)phenyl]ethylurea thus obtained can be used directly for synthesizing the dyes according to the present invention.

EXAMPLE C 32 parts of 1-amino-8-naphthol-3,6-disulfonic acid are dissolved in 150 parts of water with the aid of 50 parts of aqueous 2N lithium hydroxide solution. This solution is admixed at 0° C. by vigorous stirring with a third of the isocyanate compound solution prepared in Example A. The reaction is initially carried on at 0° C. for two hours and then without cooling for a further 6 hours with stirring. The chlorobenzene phase is separated off and discarded. The aqueous solution of the lithium salt of the compound 1-N'-[β-(4,-β'-chloroethylsulfonylphenyl)-ethyl]ureido-8-naphthol-3,6-disulfonic acid is obtained, which can be used directly for preparing a dye according to the present invention.

EXAMPLE D

Example C is repeated, except that the aminonaphtholdisulfonic acid used therein is replaced by an equivalent amount of 2-amino-8-naphthol-6-sulfonic acid and the reaction is carried out at a pH of 6.5 and at a temperature between 15° and 25° C. The resulting aqueous solution of the alkali metal salt of 2-N'-[β-(4,-β'-chloroethyl-sulfonylphenyl)ethyl] ureido-8-naphthol-6-sulfonic acid can be used directly for synthesizing a dye according to the present invention.

EXAMPLE 1

The aqueous hydrochloric acid solution of the diazonium salt of 30 parts of 2-aminonaphthalene-1,5-disulfonic acid is admixed with the solution of the coupling component of Example C, the pH is brought to 4.5 with aqueous 10% strength sodium carbonate solution, and the coupling reaction is completed at 20° C. by stirring for 2 hours. The resulting dye according to the present invention is isolated by salting out with sodium chloride, separated off and dried.

This produces the alkali metal salt (sodium salt) of the compound of the formula

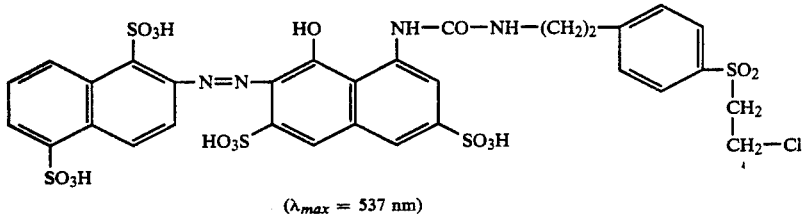

($\lambda_{max}$ = 537 nm)

which has very good fiber-reactive dye properties and, applied by the application and fixing methods customary in the art for fiber-reactive dyes to the materials mentioned in the description, in particular cellulose fiber materials, produces strong, brilliant bluish red dyeings having good fastness properties, of which the chlorinated water fastness may be mentioned in particular.

EXAMPLE 2

45 parts of 1-sulfo-6-(β-sulfatoethylsulfonyl)-2-aminonaphthalene are diazotized in a conventional manner and the resulting diazonium salt solution is admixed with the aqueous solution of the coupling component of Example C.

The coupling reaction is carried out at a pH of 4.5 and at about 20° C., and the dye according to the present invention is isolated by salting out with sodium chloride. Written in the form of the free acid it has the formula geous for use by the exhaust method and produces dyeings of virtually identical depth and hue within the temperature range between 40° and 80° C.

EXAMPLE 3

An aqueous solution of the dye of Example 2 according to the present invention is admixed with an equimolar amount of sodium thiosulfate; the reaction is carried out at 40° C. and a pH of 4 to 5. The end of the reaction may be monitored by thin layer chromatography. The dye according to the present invention which, in the form of the free acid, has the formula

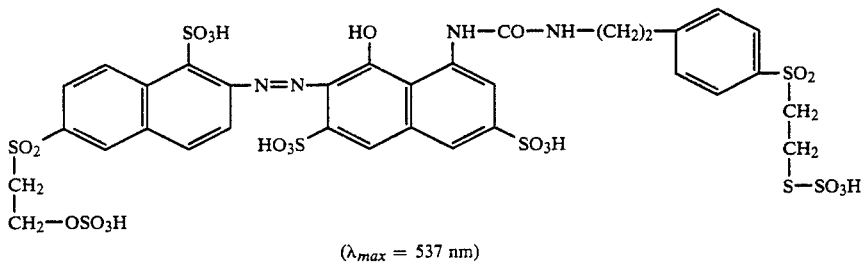

($\lambda_{max}$ = 537 nm)

is salted out by sodium chloride and isolated. It has the same good fiber-reactive dye properties as the dye of Example 2.

EXAMPLE 4

28 parts of 3-(β-sulfatoethylsulfonyl)aniline are diazotized in an aqueous solution of hydrochloric acid, the resulting suspension of the diazonium salt is admixed with the aqueous solution of the coupling component of Example D, and the coupling reaction is carried out at a pH of 4 to 5 and at about 20° C. After about 2 hours, the coupling reaction has ended. The dye according to the present invention, written in the form of the free acid, has the formula

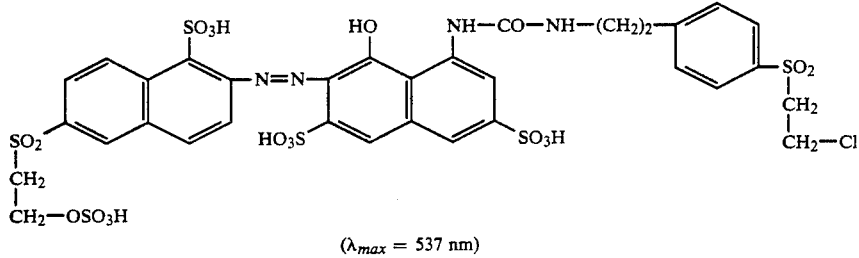

($\lambda_{max}$ = 537 nm)

shows very good fiber-reactive dye properties and, applied by the dyeing methods customary in the art for fiber-reactive dyes to the materials mentioned in the description, in particular cellulose fiber materials, produces strong, brilliant, bluish red shades. The dye according to the present invention is particularly advanta-

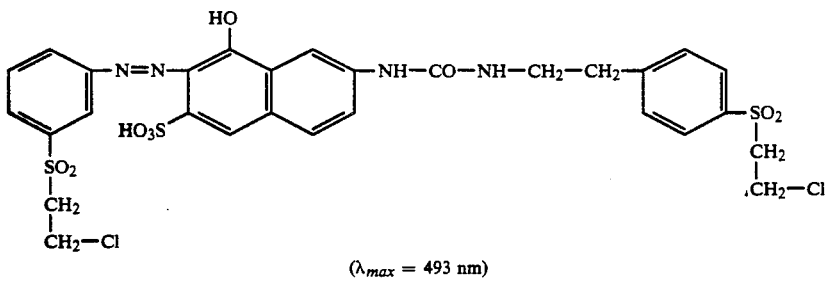

($\lambda_{max}$ = 493 nm)

is isolated from the synthesis solution by salting out with sodium chloride. It has very good fiber-reactive dye properties and produces by the application methods customary in the art strong reddish brown dyeings and prints having good fastness properties.

EXAMPLE 5

To prepare a dye according to the present invention, the procedure of Example 4 is followed, except that 3-(β-sulfatoethylsulfonyl)aniline is replaced by an equal amount of 4-(β-sulfatoethylsulfonyl)aniline as diazo component. The dye has an absorption maximum at 498 nm in aqueous solution, possesses very good fiber-reactive dye properties and produces in particular on cellulose fiber materials strong brown dyeings and prints having good fastness properties.

EXAMPLE 6

50 parts of 7-(4'-methoxy-2'-sulfophenyl)azo-8-hydroxy-6-sulfo-3-aminonaphthalene are suspended in 300 parts of water, and one third of the aqueous solution of the isocyanate compound of Example A is added with vigorous stirring at a pH of 5.5 to 6.0 and at a temperature of 15° to 20° C. The batch is subsequently stirred for about 6 hours, the chlorobenzene phase is separated off, and the dye according to the present invention is isolated from the aqueous fiber in the form of its alkali metal salt (sodium salt) by salting out with sodium chloride. Written in the form of the free acid it has the formula

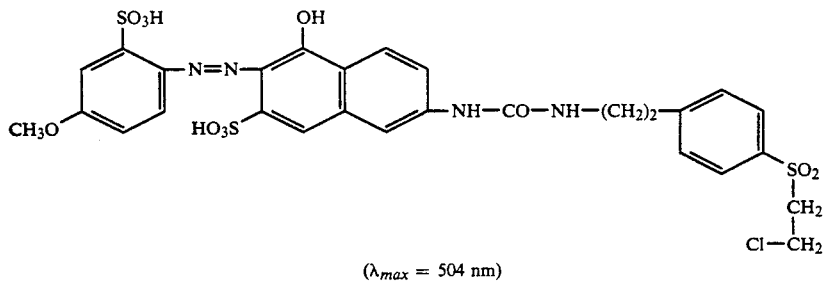

($\lambda_{max}$ = 504 nm)

possesses very good fiber-reactive dye properties and, applied by the application and fixing methods customary in the art for fiber-reactive dyes, produces in particular on cellulose fiber materials strong, scarlet shades having good fastness properties. It is further notable for a high degree of fixation when applied by exhaust dyeing at 80° C.

EXAMPLES 7 TO 42

The tabled examples which follow describe further azo dyes according to the present invention and conforming to the formula (A)

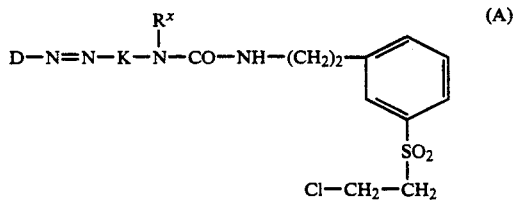

in terms of their components. They can be prepared in a manner according to the present invention, for example in the manner similar to one of the above embodiment examples, using the components evident from the particular tabled example in conjunction with the formula (A). They have very good fiber-reactive dye properties and dye the materials mentioned in the description, in particular cellulose fiber materials, such as cotton, in high color strength and with good fastness properties in the hues indicated for the particular tabled example (here for cotton).

| Example | Radical -D | Radical —K—N(R$^x$)- | Hue |
|---|---|---|---|
| 7 | 4,6,8-Trisulfo-naphth-2-yl | 3-Methyl-1,4-phenylene-1-amino | reddish yellow |
| 8 | 6-(β-Sulfatoethylsulfonyl)-1-sulfo-naphth-2-yl | 3-Acetylamino-1,4-phenylene-1-amino | reddish yellow |
| 9 | 4-(β-Sulfatoethylsulfonyl)phenyl | 3-Amino-4-sulfo-1,6-phenylene-1-amino | golden yellow |
| 10 | 4-Sulfophenyl | 3-Carboxypyrazol-5-on-4-yl-1-(2'-sulfophenyl-4'-amino) | yellow |
| 11 | 4-(β-Sulfatoethylsulfonyl)phenyl | 3-Carboxypyrazol-5-on-4-yl-1-(2'-sulfophenyl-4'-amino) | yellow |
| 12 | 2-Sulfophenyl | 3-Carboxypyrazol-5-on-4-yl-1-(2'-sulfophenyl-4'-amino) | yellow |
| 13 | 2,5-Disulfophenyl | 4-Hydroxy-2-sulfo-3,7-naphthylene-7-amino | orange |

| Example | Radical -D | Radical —K—N(R$^x$)- | Hue |
|---|---|---|---|
| 14 | 1,5-Disulfonaphth-2-yl | 4-Hydroxy-2-sulfo-3,7-naphthylene-7-amino | orange |
| 15 | 1,5-Disulfonaphth-2-yl | 4-Hydroxy-2-sulfo-3,7-naphthylene-7-methylamino | orange |
| 16 | 6-($\beta$-Sulfatoethylsulfonyl)-1-sulfonaphth-2-yl | 4-Hydroxy-2-sulfo-3,7-naphthylene-7-amino | orange |
| 17 | 8-($\beta$-Sulfatoethylsulfonyl)-1-sulfonaphth-2-yl | 4-Hydroxy-2-sulfo-3,7-naphthylene-7-amino | orange (491) |
| 18 | 2-Methoxy-3-($\beta$-sulfatoethylsulfonyl)phenyl | 4-Hydroxy-2-sulfo-3,7-naphthylene-7-amino | scarlet |
| 19 | 6-Methoxy-3-($\beta$-sulfatoethylsulfonyl)phenyl | 4-Hydroxy-2-sulfo-3,7-naphthylene-7-amino | orange (490) |
| 20 | 4-($\beta$-Sulfatoethylsulfonyl)phenyl | 4-Hydroxy-2,8-disulfo-3,5-naphthylene-5-amino | yellowish red |
| 21 | 4-Methoxy-2-sulfophenyl | 4-Hydroxy-2-sulfo-3,6-naphthylene-6-amino | yellowish red |
| 22 | 2-Sulfophenyl | 4-Hydroxy-2,7-disulfo-3,5-naphthylene-5-amino | red |
| 23 | 2-Sulfophenyl | 4-Hydroxy-2,8-disulfo-3,5-naphthylene-5-amino | yellowish red |
| 24 | 2,5-Dicarboxyphenyl | 4-Hydroxy-2,8-disulfo-3,5-naphthylene-5-amino | red |
| 25 | 4-($\beta$-Sulfatoethylsulfonyl)phenyl | 4-Hydroxy-2,8-disulfo-3,5-naphthylene-5-amino | red |
| 26 | 4-($\beta$-Sulfatoethylsulfonyl)phenyl | 4-Hydroxy-2,7-disulfo-3,5-naphthylene-5-amino | red |
| 27 | 3-($\beta$-Sulfatoethylsulfonyl)phenyl | 4-Hydroxy-2,7-disulfo-3,5-naphthylene-5-amino | red (368) |
| 28 | 2-Sulfo-4-($\beta$-sulfatoethylsulfonyl)phenyl | 4-Hydroxy-2,7-disulfo-3,5-naphthylene-5-amino | yellowish red (397) |
| 29 | 6-($\beta$-Sulfatoethylsulfonyl)-1-sulfonaphth-2-yl | 4-Hydroxy-2,8-disulfo-3,5-naphthylene-5-amino | red |
| 30 | 4,8-Disulfonaphth-2-yl | 4-Hydroxy-2,7-disulfo-3,5-naphthylene-5-amino | bluish red (424) |
| 31 | 3-Sulfo-4-(phenylamino)phenyl | 4-Hydroxy-2,7-disulfo-3,5-naphthylene-5-amino | blue |
| 32 | 3-Sulfo-4-(2'-methoxyphenylamino)phenyl | 4-Hydroxy-2,7-disulfo-3,5-naphthylene-5-amino | blue |
| 33 | 4-(3',6',8'-trisulfonaphth-2'-ylazo)-2-methoxy-5-methylphenyl | 4-Hydroxy-2,7-disulfo-3,5-naphthylene-5-amino | blue |
| 34 | 4-(4'-Methoxy-2'-sulfophenylazo)-6-sulfonaphth-1-yl | 6-Sulfo-1,4-naphthylene-1-amino | brown |
| 35 | 4-(4'-Methoxy-2'-sulfophenylazo)-7-sulfonaphth-1-yl | 7-Sulfo-1,4-naphthylene-1-amino | brown |
| 36 | 4-(4',6',8'-trisulfo naphth-2-ylazo)-6-sulfonaphth-1-yl | 3-Methyl-1,4-phenylene-1-amino | brown |
| 37 | 4-(2',5',7'-trisulfonaphth-1'-ylazo)-2,5-dimethylphenyl | 6-Sulfo-1,4-naphthylene-1-amino | brown |
| 38 | 1:1 copper complex of: 4,8-disulfo-1-hydroxynaphth-2-yl | 4-Hydroxy-2,7-disulfo-3,5-naphthylene-5-amino | blue |
| 39 | 1:2 chromium complex of: 2-carboxyphenyl | 4-Hydroxy-2,7-di sulfo-3,5-naphthylene-5-amino | black |
| 40 | 1:1 copper complex of: 2-Hydroxy-5-($\beta$-sulfatoethylsulfonyl)phenyl | 4-Hydroxy-2,7-disulfo-3,5-naphthylene-5-amino | reddish blue (387) |
| 41 | 3,6,8-Trisulfonaphth-2-yl | 3-Ureido-1,4-phenylene-1-amino | reddish yellow |
| 42 | 4,8-Disulfonaphth-2-yl | 3-Acetylamino-1,4-phenylene-1-amino | reddish yellow |

EXAMPLE 43

The aqueous solution of the diazo component of Example B is admixed with 200 parts of ice and diazotized in a conventional manner after adding concentrated aqueous hydrochloric acid and aqueous 5N sodium nitrite solution. The mixture is subsequently stirred for 2 hours, excess nitrous acid is destroyed with sulfamic acid, a solution of 60 parts of 2-(4'-$\beta$-sulfatoethylsulfonylphenyl)-azo-3,5-disulfo-8-hydroxy-1-aminonaphthalene in 200 parts of water is then added, and the coupling reaction is carried out at pH 4.5 to 5.0 and 20° C. for about 3 to 5 hours.

The azo dye obtained according to the present invention is isolated in the form of its alkali metal salt (sodium salt) by evaporating the synthesis solution under reduced pressure or by spray drying. Written in the form of the free acid it has the formula

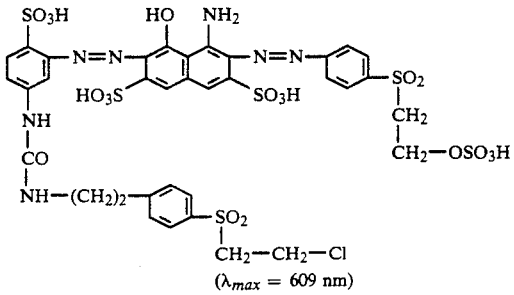

($\lambda_{max}$ = 609 nm)

and possesses very good fiber-reactive dye properties. Applied by the application and fixing methods customary in the art for fiber-reactive dyes it produces on the materials mentioned in the description, in particular cellulose fiber materials, strong, navy shades having good fastness properties.

EXAMPLE 44

To prepare an azo dye according to the present invention, the procedure of Example 43 is repeated, except that the coupling component used is not the monoazo starting compound but 1-(4'-sulfophenyl)-3-carboxy-5-pyrazolone. The alkali metal salt (sodium salt) of the compound of the formula

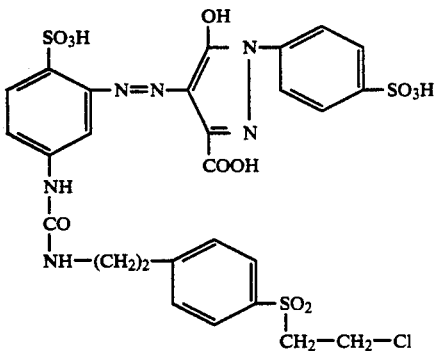

is obtained in the form of a yellow dye powder containing an electrolyte (predominantly sodium chloride). Applied by conventional dyeing and printing methods the azo dye according to the present invention produces for example on cotton strong yellow dyeings and prints having good fastness properties.

EXAMPLES 45 TO 64

The tabled examples which follow describe further novel azo dyes according to the present invention and conforming to the formula (B)

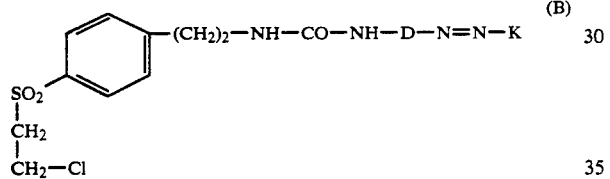

in terms of their components. They can be prepared in a manner according to the present invention, for example similar to one of the above embodiment examples, using the components evident from the particular tabled example in conjunction with the formula (B). They have very good fiber-reactive dye properties and dye the materials mentioned in the description, in particular cellulose fiber materials, such as cotton, in high color strength and with good fastness properties in the hues indicated in the particular tabled example (here for cotton).

| Example | Radical —D— | Radical —K | Hue |
|---|---|---|---|
| 45 | ⌬—SO₃H | 1-(β-Sulfatoethyl)-2-hydroxy-4-methyl-pyrid-6-on-3-yl | greenish yellow |
| 46 | ⌬—SO₃H | 1-Ethyl-2-hydroxy-4-methyl-5-carb-amoylpyrid-6-on-3-yl | greenish yellow |
| 47 | 4,6-Disulfo-1,3-phenylene | 1-Ethyl-2-hydroxy-4-methyl-5-carb-amoylpyrid-6-on-3-yl | greenish yellow |
| 48 | ⌬—SO₃H | 5-Amino-4-hydroxy-6-(4'-sulfophenylazo)-2,7-disulfonaphth-3-yl | navy |
| 49 | 4,6-Disulfo-1,3-phenylene | 1,4-Dimethyl-2-hydroxy-5-carb-amoylpyrid-6-on-3-yl | greenish yellow |
| 50 | ⌬—SO₃H | 1,4-Dimethyl-2-hydroxy-5-(sulfo-methyl)-pyrid-6-on-3-yl | greenish yellow |
| 51 | ⌬—SO₃H | 1-(4'-Sulfophenyl)-3-methylpyrazol-5-on-4-yl | yellow |
| 52 | ⌬—SO₃H | 1-(4'-Sulfo-2',5'-dichlorophenyl)-3-methylpyrazol-5-on-4-yl | yellow |
| 53 | ⌬—SO₃H | 1-(4'-Sulfophenyl)-3-carboxypyrazol-5-on-4-yl | yellow |
| 54 | ⌬—SO₃H | 5-Amino-4-hydroxy-6-(4'-sulfophenylazo)-2,7-disulfonaphth-3-yl | navy |
| 55 | ⌬—SO₃H | 1-[4'-(β-Sulfato-ethylsulfonyl)-phenyl]-3-methyl-pyrazol-5-on-4-yl | yellow |
| 56 | 4,6-Disulfo-1,3-phenylene | 1-[4'-(β-Sulfato-ethylsulfonyl)-phenyl]-3-methyl-pyrazol-5-on-4-yl | yellow |
| 57 | ⌬—SO₃H | 4-Hydroxy-5-acetyl-amino-2,7-disulfo-naphth-3-yl | yellowish red |
| 58 | ⌬—SO₃H | 4-Hydroxy-5-benzoyl-amino-2,7-di-sulfonaphth-3-yl | yellowish red |
| 59 | ⌬—SO₃H | 4-Hydroxy-5-benzoyl-amino-2,8-di-sulfonaphth-3-yl | yellowish red |
| 60 | ⌬—SO₃H | 5-[4'-Chloro-6'-(β-sulfoethylamino)-1',3',5'-triazin-2'-yl]amino-4-hydroxy-2,7-disulfonaphth-3-yl | yellowish red |
| 61 | ⌬—SO₃H | 5-[4'-Chloro-6'-amino-1',3',5'-tri-azin-2'-yl]amino-4-hydroxy-2,7-di-sulfonaphth-3-yl | yellowish red |
| 62 | ⌬—SO₃H | 5-Amino-4-hydroxy-6-[4'-(β-sulfato-ethylsulfonyl)phenyl-azo]-2,7-disulfo-naphth-3-yl | navy |
| 63 | ⌬—SO₃H | 5-Amino-4-hydroxy-6-(4'-sulfophenylazo)-2,7-disulfonaphth-3-yl | navy |
| 64 | ⌬—SO₃H | 1-(β-Sulfoethyl-2-hydroxy-4-methyl-pyrid-6-on-3-yl | greenish yellow |

-continued

| Example | Radical —D— | Radical —K | Hue |
|---|---|---|---|
| 65 | ![benzene with SO3H] | 1-(4'-Sulfophenyl)-3-methyl-5-pyrazol 5-on-4-yl | yellow |

EXAMPLE 66

49 parts of 1-amino-2-sulfo-4-(3'-amino-4'-sulfophenyl)-amino-9,10-anthraquinone are reacted in aqueous solution at 20° to 25° C. and at a pH of 5 to 6 with one third of the aqueous solution of the isocyanate compound of Example A by stirring for several hours until the reaction has ended, which may be monitored chromatographically.

Customary clarification of the synthesis solution gives the dye according to the present invention of the formula (written in the form of the free acid)

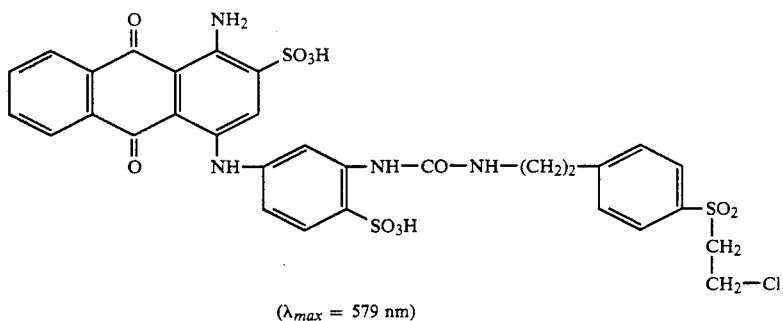

($\lambda_{max}$ = 579 nm)

in the form of the alkali metal salt (sodium salt) following evaporation of the filtrate. Applied by the application and fixing methods customary for fiber-reactive dyes it dyes the materials mentioned in the description, in particular cellulose fibre materials, for example cotton, in strong, brilliant blue shades.

EXAMPLE 67

To prepare an anthraquinone dye according to the present invention, the procedure of Example 66 is repeated, except that the starting anthraquinone compound used comprises 49 parts of 1-amino-2-sulfo-4-(3'-amino-2',4',6'-trimethyl-5'-sulfophenyl)amino-9,10-anthraquinone. Written in the form of the free acid, the dye has the formula

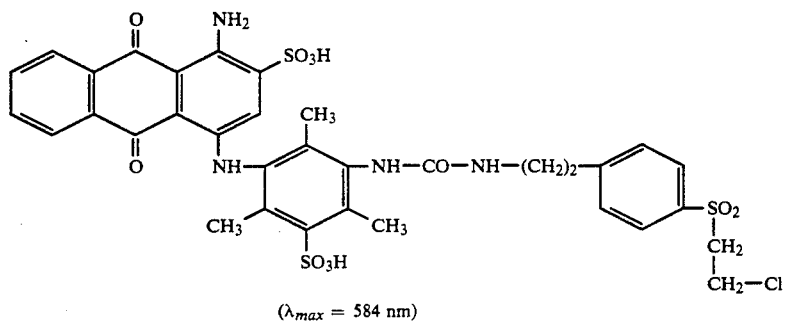

($\lambda_{max}$ = 584 nm)

It exhibits very good fiber-reactive dye properties and applied by the application and fixing methods customary in the art produces for example on cotton dyeings and prints in strong, brilliant blue shades.

EXAMPLE 68

About 3000 parts of an aqueous pH 6.5 and 10°-15° C. solution of 31.6 parts of the triphendioxazine compound of the formula

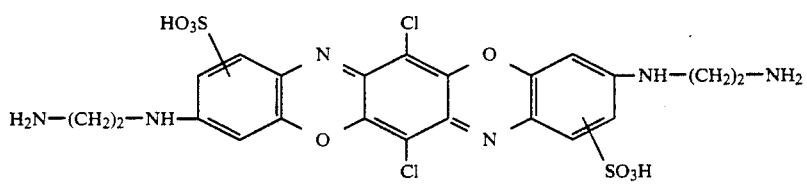

is admixed with one third of the aqueous solution of the isocyanate compound of Example A by vigorous stirring, and the reaction is continued for a further 4 hours under the conditions specified in Example C. The chlorobenzene phase is separated off, the aqueous synthesis solution is clarified in a conventional manner, and the filtrate is treated (for example spray dried) to isolate the anthraquinone dye according to the present invention in the form of its alkali metal salt (sodium salt). Written in the form of the free acid it has the formula

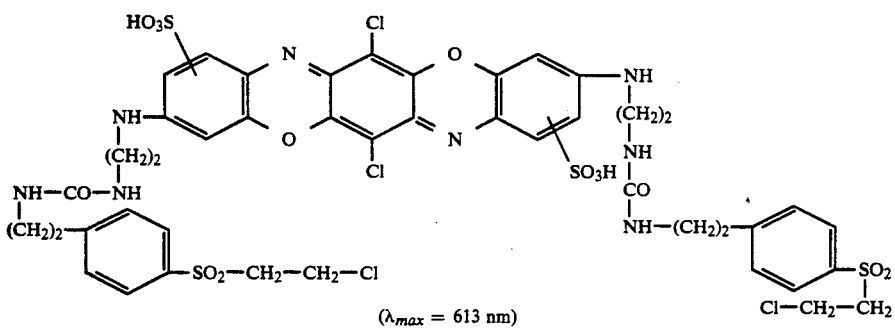

($\lambda_{max}$ = 613 nm)

and applied by application and fixing methods customary in the art for fiber-reactive dyes it produces strong, reddish blue dyeings and prints having good fastness properties.

clarified in a conventional manner and the filtrate is evaporated under reduced pressure.

This gives a blue, electrolyte-containing powder of the alkali metal salt (sodium salt) of the compound of the formula

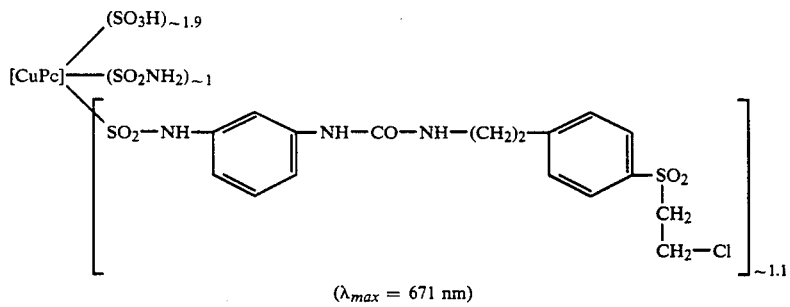

($\lambda_{max}$ = 671 nm)

EXAMPLE 69

58.5 parts of the copper phthalocyanine compound of the formula

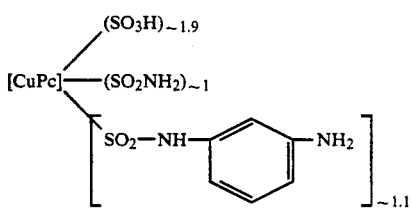

are homogeneously suspended in a mixture of 600 parts of ice and 600 parts of water and the suspension is brought to pH 7 with sodium hydroxide solution. One third of the aqueous solution of the isocyanate compound of Example A is added and the pH is maintained at 6.0 to 6.5. After stirring for one hour the temperature is raised to 40° C. and the reaction is completed at that temperature and the specified pH range (verifiable by thin layer chromatography). The chlorobenzene phase is separated off and discarded. The aqueous phase is The copper phthalocyanine dye according to the present invention has very good fiber-reactive dyeing properties and applied by the customary application and fixing methods produces on the materials mentioned in the description, in particular cellulose fiber materials, strong, fast, turquoise shades.

EXAMPLE 70

To prepare a copper phthalocyanine compound according to the present invention, the procedure of Example 69 is followed, except that the copper phthalocyanine starting compound is replaced by the copper phthalocyanine starting compound of the formula

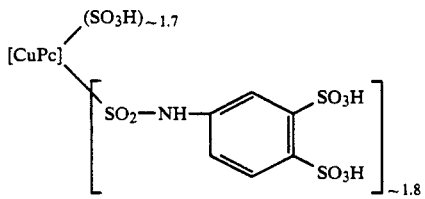

in an equivalent amount, affording the novel phthalocyanine dye of the formula

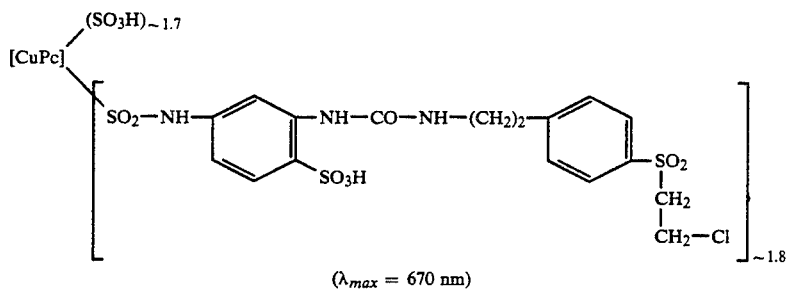

($\lambda_{max}$ = 670 nm)

The copper phthalocyanine dye according to the present invention dyes the materials mentioned in the description, in particular cellullose fiber materials, in a conventional application process in strong, fast, turquoise shades.

EXAMPLE 71

A neutral solution of 80 parts of the copper formazan compound of the formula

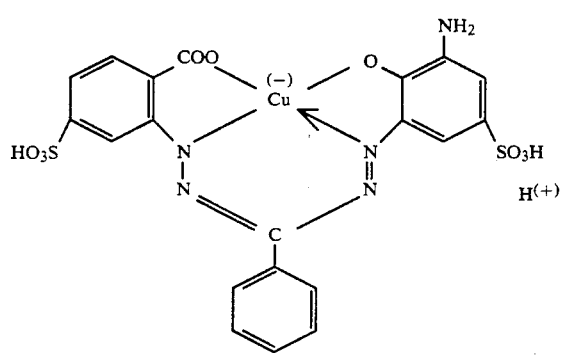

in 400 parts of water is admixed at 15° to 25° C. with one third of the aqueous solution of the isocyanate compound of Example A by thorough stirring. After the reaction has ended, which may be monitored by thin layer chromatography, the chlorobenzene phase is separated off and the aqueous phase is clarified. The copper formazan compound according to the present invention is isolated from the aqueous synthesis solution by salting out with sodium chloride. This gives a blue, electrolyte (predominantly sodium chloride)-containing powder of the alkali metal salt (sodium salt) of the compound of the formula

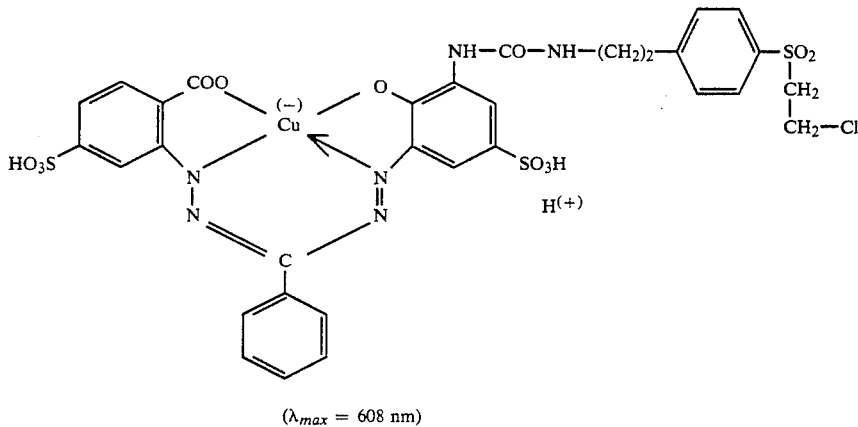

($\lambda_{max}$ = 608 nm)

This copper formazan dye according to the present invention has very good coloristic properties. Applied by the application and fixing methods customary in the art for fiber-reactive dyes, in particular if applied by the exhaust method at from 40° to 60° C., it produces for example on cotton strong blue dyeings having good fastness properties, in front of which the chlorine fastness may be mentioned in particular.

EXAMPLE 72

To prepare a copper formazan dye according to the present invention, the procedure of Example 71 is followed, except that the starting compound used is the isomeric amino-containing copper formazan starting compound in which the sulfo group in the hydrazone moiety is not para to the carbonyloxy group but meta to the carbonyloxy group and bonded in the para position with respect to the nitrogen atom. The alkali metal salt is obtained of the dye of the formula

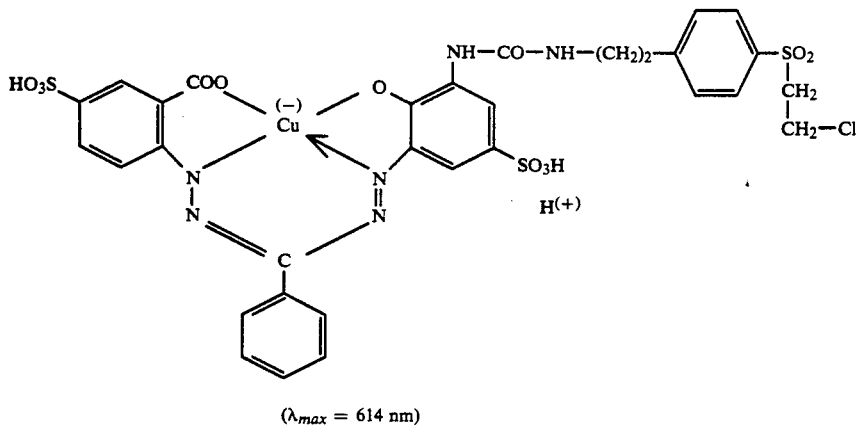

($\lambda_{max}$ = 614 nm)

which likewise has very good fiber-reactive properties and dyes for example cotton in strong blue fast shades.

EXAMPLES 73 TO 108

The tabled examples which follow describe further azo dyes according to the present invention and conforming to the formula (C)

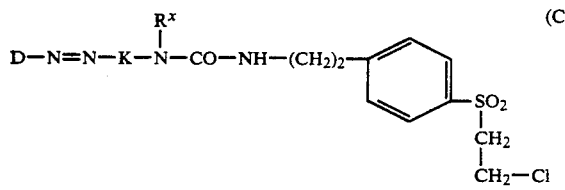

in terms of their components. They can be prepared in a manner according to the present invention, for example in the manner similar to one of the above embodiment examples, using the components evident from the particular tabled example in conjunction with the formula (C). They have very good fiber-reactive dye properties and dye the materials mentioned in the description, in particular cellulose fiber materials, such as cotton, in high color strength and with good fastness properties in the hues indicated for the particular tabled example (here for cotton).

| Example | Radical -D | Radical —K—N(R$^x$)- | Hue |
|---|---|---|---|
| 73 | 4,6,8-Trisulfo-naphth-2-yl | 3-Methyl-1,4-phenylene-1-amino | reddish yellow |
| 74 | 6-($\beta$-Sulfatoethyl-sulfonyl)-1-sulfo-naphth-2-yl | 3-Acetylamino-1,4-phenylene-1-amino | reddish yellow |
| 75 | 4-($\beta$-Sulfatoethyl-sulfonyl)phenyl | 3-Amino-4-sulfo-1,6-phenylene-1-amino | golden yellow |
| 76 | 4-Sulfophenyl | 3-Carboxypyrazol-5-on-4-yl-1-(2'-sulfophenyl-4'-amino) | yellow |
| 77 | 4-($\beta$-Sulfatoethyl-sulfonyl)phenyl | 3-Carboxypyrazol-5-on-4-yl-1-(2'-sulfophenyl-4'-amino) | yellow |
| 78 | 2-Sulfophenyl | 3-Carboxypyrazol-5-on-4-yl-1-(2'-sulfophenyl-4'-amino) | yellow |
| 79 | 2,5-Disulfophenyl | 4-Hydroxy-2-sulfo-3,7-naphthylene-7-amino | orange |
| 80 | 1,5-Disulfonaphth-2-yl | 4-Hydroxy-2-sulfo-3,7-naphthylene-7-amino | orange |
| 81 | 1,5-Disulfonaphth-2-yl | 4-Hydroxy-2-sulfo-3,7-naphthalene-7-methylamino | orange |
| 82 | 6-($\beta$-Sulfatoethyl-sulfonyl)-1-sulfo-naphth-2-yl | 4-Hydroxy-2-sulfo-3,7-naphthylene-7-amino | orange |
| 83 | 8-($\beta$-Sulfatoethyl-sulfonyl)-1-sulfo-naphth-2-yl | 4-Hydroxy-2-sulfo-3,7-naphthylene-7-amino | orange (491) |
| 84 | 2-Methoxy-3-$\beta$ sulfatoethyl-sulfonyl)phenyl | 4-Hydroxy-2-sulfo-3,7-naphthylene-7-amino | scarlet |
| 85 | 6-Methoxy-3-($\beta$-sulfatoethyl-sulfonyl)phenyl | 4-Hydroxy-2-sulfo-3,7-naphthylene-7-amino | orange (490) |
| 86 | 4-($\beta$-Sulfatoethyl-sulfonyl)phenyl | 4-Hydroxy-2,8-di-sulfo-3,5-naphthylene-5-amino | yellowish red |
| 87 | 4-Methoxy-2-sulfophenyl | 4-Hydroxy-2-sulfo-3,6-naphthylene-6-amino | yellowish red |
| 88 | 2-Sulfophenyl | 4-Hydroxy-2,7-di-sulfo-3,5-naphthylene-5-amino | red |
| 89 | 2-Sulfophenyl | 4-Hydroxy-2,8-di-sulfo-3,5-naphthylene-5-amino | yellowish red |
| 90 | 2,5-Dicarboxyphenyl | 4-Hydroxy-2,8-di-sulfo-3,5-naphthylene-5-amino | red |
| 91 | 4-($\beta$-Sulfatoethyl-sulfonyl)phenyl | 4-Hydroxy-2,8-di-sulfo-3,5-naphthylene-5-amino | red |
| 92 | 4-($\beta$-Sulfatoethyl-sulfonyl)phenyl | 4-Hydroxy-2,7-di-sulfo-3,5-naphthylene-5-amino | red (525) |
| 93 | 3-($\beta$-Sulfatoethyl-sulfonyl)phenyl | 4-Hydroxy-2,7-di-sulfo-3,5-naphthylene-5-amino | red (368) |
| 94 | 2-Sulfo-4-($\beta$-sulfatoethyl-sulfonyl)phenyl | 4-Hydroxy-2,7-di-sulfo-3,5-naphthylene-5-amino | yellowish red (397) |
| 95 | 6-($\beta$-Sulfatoethyl-sulfonyl)-1-sulfo-naphth-2-yl | 4-Hydroxy-2,8-di-sulfo-3,5-naphthylene-5-amino | red |
| 96 | 4,8-Disulfonaphth-2-yl | 4-Hydroxy-2,7-di-sulfo-3,5-naphthylene-5-amino | bluish red (424) |
| 97 | 3-Sulfo-4-(phenyl-amino)phenyl | 4-Hydroxy-2,7-di-sulfo-3,5-naphthylene-5-amino | blue |
| 98 | 3-Sulfo-4-(2'-methoxyphenyl- | 4-Hydroxy-2,7-di-sulfo-3,5-naphthyl- | blue |

-continued

| Example | Radical -D | Radical —K—N(R$^x$)- | Hue |
|---|---|---|---|
|  | amino)phenyl | ene-5-amino |  |
| 99 | 4-(3',6',8'-tri-sulfonaphth-2'-yl-azo)-2-methoxy-5-methylphenyl | 4-Hydroxy-2,7-di-sulfo-3,5-naphthyl-ene-5-amino | blue |
| 100 | 4-(4'-Methoxy-2'-sulfophenylazo)-6-sulfonaphth-1-yl | 6-Sulfo-1,4-naphth-ylene-1-amino | brown |
| 101 | 4-(4'-Methoxy-2'-sulfophenylazo)-7-sulfonaphth-1-yl | 7-Sulfo-1,4-naphth-ylene-1-amino | brown |
| 102 | 4-(4',6',8'-tri-sulfonaphth-2-ylazo)-6-sulfo-naphth-1-yl | 3-Methyl-1,4-pheny-lene-1-amino | brown |
| 103 | 4-(2',5',7'-tri-sulfonaphth-1'-yl-azo)-2,5-dimethyl-phenyl | 6-Sulfo-1,4-naphth-ylene-1-amino | brown |
| 104 | 1:1 copper complex of: 4,8-disulfo-1-hydroxynaphth-2-yl | 4-Hydroxy-2,7-di-sulfo-3,5-naphthyl-ene-5-amino | blue |
| 105 | 1:2 chromium complex of: 2-carboxyphenyl | 4-Hydroxy-2,7-di-sulfo-3,5-naphthyl-ene-5-amino | black |
| 106 | 1:1 copper complex of: 2-Hydroxy-5-(β-sulfatoethyl-sulfonyl)phenyl | 4-Hydroxy-2,7-di-sulfo-3,5-naphthyl-ene-5-amino | reddish blue (387) |
| 107 | 3,6,8-Trisulfo-naphth-2-yl | 3-Ureido-1,4-pheny-lene-1-amino | reddish yellow |
| 108 | 4,8-Disulfonaphth-2-yl | 3-Acetylamino-1,4-phenylene-1-amino | reddish yellow |

EXAMPLE 109 a) To a suspension of 162 parts of m-phenylenediamine in 1000 parts per volume of dichloromethane is gradually added at 20° C. 273.5 parts of β-[4-(β'-chloro-ethylsulfonyl)-phenyl]ethyl isocyanate (Example A), stirring is continued for about a further two hours, the dichloromethane is distilled off under reduced pressure, and the residue is boiled up for purification with 300 parts per volume of water and thereafter suspended in 500 parts per volume of a 1:1 water/acetone mixture. To this suspension is added a conventionally prepared aqueous solution of the diazonium salt of 416 parts of 2-aminonaphthalene-3,618-trisulfonic acid and the coupling reaction is carried out at a pH value between 4 and 5 and at a temperature of about 20° C.

b) The solution of the amino-azo compound obtained as per a) is admixed with a suspension of 198 parts of cyanuric chloride in 100 parts of water and 800 parts of ice. The reaction is effected at about 0° C. by maintaining a pH value of 4.5. The subsequent second condensation reaction is effected after addition of 281 parts of 4-(β-sulfatoethylsulfonyl)-aniline at a temperature of about 75° C. and at a pH value between 4.5 and 5.

The resulting azo compound according to the invention is isolated by salting out with sodium chloride. It has the constitution of the general formula (25a) in which W stands for chlorine and R* denotes the B-sulfatoethylsulfonyl group, bonded to the benzene nucleus in paraposition relative to the amino group, and has an absorption maximum at 398 nm in aqueous solution. It exhibits very good fiber-reactive dye properties and produces for example on cotton by the application methods customary for fiber-reactive dyes yellow dyeings and prints having good fastness properties.

EXAMPLE 110

To prepare an azo compound according to the invention first the procedure of Example 109 a) is followed and 150 parts of cyanuric fluoride are added to the solution of the amino-azo compound at 0° C. while maintaining a pH value between 4 and 5. The subsequent second condensation reaction is effected by addition of 281 parts of 4-(β-sulfatoethylsulfonyl)-aniline at 40° C. and at a pH value of about 4.5.

The resulting azo compound according to the invention is isolated by salting out with sodium chloride. It has an absorption maximum at 398 nm in aqueous solution and possesses the constitution of the general formula (25a) in which W stands for fluorine and R* denotes the β-sulfatoethylsulfonyl group, bonded to the benzene nucleus in para-position relative to the amino group. By the application methods customary for fiber-reactive dyes it dyes for example cotton in fast, strong yellow shades.

EXAMPLE 111

To prepare an azo compound according to the invention the procedure of Example 109 is followed, except that in the second condensation reaction the 4-(β-sulfatoethylsulfonyl)-aniline is replaced by the same amount of the isomeric compound 3-(β-sulfatoethylsulfonyl)-aniline. The resulting azo compound according to the invention has an absorption maximum of 398 nm in aqueous solution and possesses the constitution of the general formula (25a) in which W stands for chlorine and R* denotes the β-sulfatoethylsulfonyl group, bonded to the benzene nucleus in the meta-position relative to the amino group. It possesses very good fiber-reactive dye properties and dyes the materials mentioned in the description, such as, for example, cellulose fiber materials, in particular cotton, by the customary dyeing and printing methods in strong, fast, yellow shades.

EXAMPLE 112

To prepare an azo compound according to the invention the procedure of Example 110 is followed, except that in the second condensation reaction the 4-(β-sulfatoethylsulfonyl)-aniline is replaced by the same amount of the isomeric compound 3-(β-sulfatoethylsulfonyl)-aniline. The resulting azo compound according to the invention has an absorption maximum of 398 nm in aqueous solution and possesses the constitution of the general formula (25a)' in which W stands for fluorine and R* denotes the β-sulfatoethylsulfonyl group, [lacuna] to [lacuna] in meta-position relative to the amino group [lacuna] the dye properties and dyes the materials mentioned in the description, such as, for example, cellulose fiber materials, in particular cotton, by the customary dyeing and printing methods in strong, fast, yellow shades.

EXAMPLE 113

To prepare an azo compound according to the invention first the procedure of Example 109 a) is followed, 100 parts of cyanuric chloride are suspended in a mixture of 100 parts of water and 800 parts of ice and the aqueous solution of the benzene nucleus prepared as per Example 109 a), denotes. It possesses very good fiber-reactive amino-azo compound too. This condensation reaction is carried out at about 0° C. by maintaining a pH value of 4.5. The subsequent second condensation reaction is effected after addition of 42 parts of cyanamide at a temperature of 40° C. and at a pH value of 9. The subsequent third condensation reaction with 4-(β-sulfatoethylsulfonyl)-aniline (281 parts) is effected analogously to the particulars of Example 109 b) at a temperature of about 75° C. and a pH value between 4.5 and 5.

The resulting azo compound according to the invention is isolated by salting out with sodium chloride. It has an absorption maximum at 398 nm in aqueous solution and possesses the chemical constitution of the general formula (25a) in which W stands for the cyanamido group and R* denotes the β-sulfatoethylsulfonyl group, bonded to the benzene nucleus in para-position relative to the amino group. The azo compound according to the invention dyes by the application methods customary for fiber-reactive dyes for example cotton in strong, fast, yellow shades.

EXAMPLE 114

To prepare an azo compound according to the invention the procedure of Example 113 is followed, except that the third condensation reaction is carried out not with 4-(β-sulfatoethylsulfonyl)-aniline but with the isomeric compound 3-(β-sulfatoethylsulfonyl)-aniline in the same amount. The azo compound according to the invention possesses the constitution of the general formula (25a) in which W stands for the cyanamido group and R* denotes the β-sulfatoethylsulfonyl group, bonded to the benzene nucleus in meta-position relative to the amino group. In aqueous solution it has an absorption maximum at 398 nm; by the application and fixing methods customary for fiber-reactive dyes it dyes for example cotton in strong, fast, yellow shades.

We claim:

1. A water-soluble dye conforming to the formula (1)

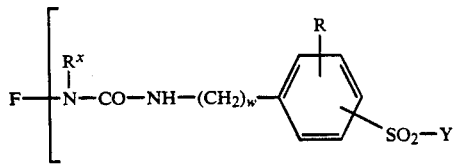

in which
- F is the radical of a monoazo, polyazo, metal complex azo, anthraquinone, phthalocyanine, azomethine, dioxazine, phenazine, stilbene, triphenylmethane, xanthene, formazan, thioxanthone, nitroaryl, naphthoquinone, pyrenequinone or perylenetetracarbimide dye;
- $R^x$ is hydrogen or alkyl of 1 to 4 carbon atoms;
- R is hydrogen, sulfo, carboxyl, alkyl of 1 to 4 carbon atoms, alkoxy of 1 to 4 carbon atoms or chlorine;
- w is 1, 2, 3 or 4;
- Y is vinyl or an ethyl group which contains in the β-position a substituent which is eliminable by alkali to form a vinyl group;
- n is 1 or 2.

2. A dye as claimed in claim 1 of the formula (15a)

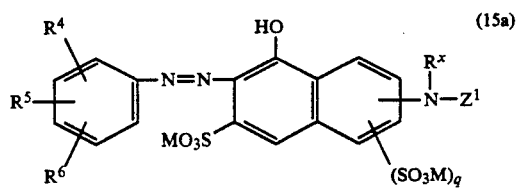

in which
- M is hydrogen or an alkali metal;
- q is zero or 1;
- has one of the meanings mentioned in claim 1;
- $Z^1$ is a group of the formula (2A)

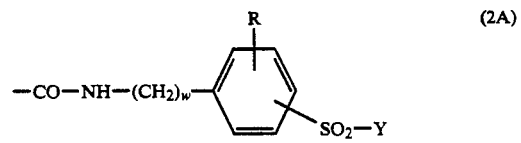

in which w, R and Y have the meanings mentioned in claim 1;
- $R^4$ is hydrogen, alkyl of 1 to 4 carbon atoms, alkoxy of 1 to 4 carbon atoms, halogen, carboxyl or sulfo;
- $R^5$ is hydrogen, alkyl of 1 to 4 carbon atoms, alkoxy of 1 to 4 carbon atoms, halogen, carboxyl or sulfo;
- $R^6$ is hydrogen, sulfo, β-sulfatoethylsulfonyl, β-chloroethylsulfonyl or vinylsulfonyl.

3. A dye as claimed in claim 1 of the general formula (15b)

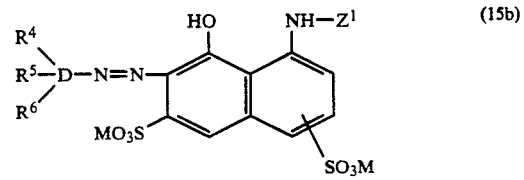

in which
- M is hydrogen or an alkali metal;
- D is a benzene ring or a naphthalene ring to which the azo group is bonded in the β-position, if the latter $R^4$ and $R^5$ each being independently of the other hydrogen or sulfo;
- $Z^1$ is a group of the formula (2A)

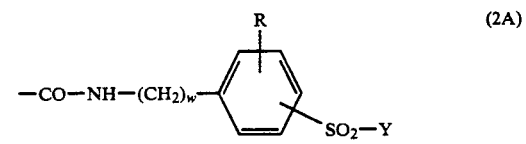

in which w, R and Y have the meanings mentioned in claim 1;
- $R^4$ is hydrogen, alkyl of 1 to 4 carbon atoms, alkoxy of 1 to 4 carbon atoms, halogen, carboxyl or sulfo;
- $R^5$ is hydrogen, alkyl of 1 to 4 carbon atoms, alkoxy of 1 to 4 carbon atoms, halogen, carboxyl or sulfo;
- $R^6$ is hydrogen, sulfo, β-sulfatoethylsulfonyl, β-chloroethylsulfonyl or vinylsulfonyl.

4. A dye as claimed in claim 3, wherein D is a benzene ring, $R^4$ and $R^5$ are both hydrogen, $R^6$ is vinylsulfonyl, β-chloroethylsulfonyl or β-sulfatoethylsulfonyl in meta- or para-position relative to the azo group and one of the —SO$_3$M groups is bonded to the naphthalene radical in the meta-position relative to the group —NH—Z$^1$.

5. A dye as claimed in claim 3, wherein D is a naphthalene ring to which the azo group is bonded in the 2-position, R$^4$ is sulfo in the 1-position of the naphthalene ring, R$^5$ is hydrogen, R$^6$ is vinylsulfonyl, β-chloroethylsulfonyl or β-sulfatoethylsulfonyl in the 6-position on the naphthalene ring and one of the —SO$_3$M groups is bonded to the naphthol radical in the meta-position relative to the group —NH—Z$^1$.

6. A dye as claimed in claim 1 of the formula (16a)

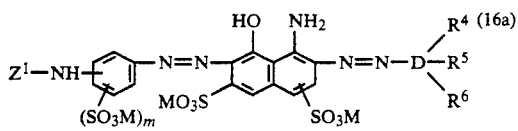

in which
M is hydrogen or an alkali metal,
m is 1,
D is a benzene ring,
R$^4$ and R$^5$ are both hydrogen,
R$^6$ is vinylsulfonyl, β-chloroethylsulfonyl or β-sulfatoethylsulfonyl in the meta- or para-position on the benzene ring, and
Z$^1$ is a group of the formula (2A)

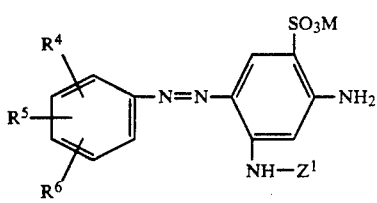

in which w, R and Y have the meanings mentioned in claim 1.

7. A dye as claimed in claim 1 of the formula (15g)

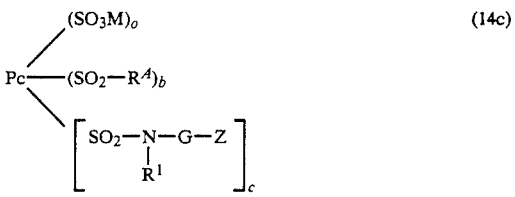

in which
M is hydrogen or an alkali metal,
Z$^1$ is a group of the formula (2A)

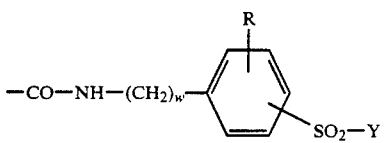

in which w, R and Y have the meanings mentioned in claim 1;
R$^4$ is hydrogen, alkyl of 1 to 4 carbon atoms, alkoxy of 1 to 4 carbon atoms, halogen, carboxyl or sulfo;
R$^5$ is hydrogen, alkyl of 1 to 4 carbon atoms, alkoxy of 1 to 4 carbon atoms, halogen, carboxyl or sulfo;
R$^6$ is hydrogen, sulfo, β-sulfatoethylsulfonyl, β-chloroethylsulfonyl or vinylsulfonyl.

8. A triphendioxazine dye as claimed in claim 1 conforming to the formula (14b)

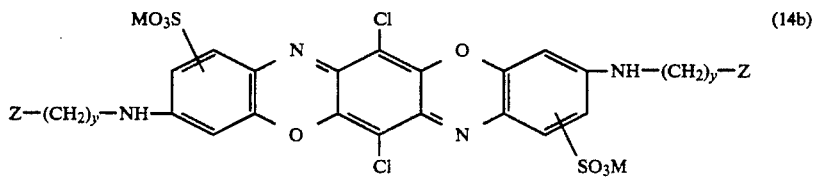

in which
M is hydrogen or alkali metal,
Z is a group of the formula (2)

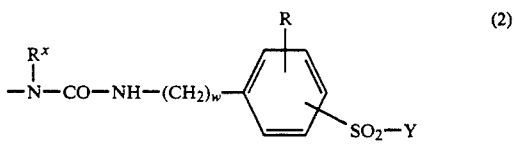

where R$^x$, w, R and Y have the meanings mentioned in claim 1, and
y is 2, 3 or 4.

9. A phthalocyanine dye as claimed in claim 1, of the formula (14c)

$$Pc \begin{array}{c} (SO_3M)_o \\ (SO_2-R^4)_b \\ \left[ SO_2-N-G-Z \atop R^1 \right]_c \end{array}$$

(14c)

in which
Pc is the radical of a copper or nickel phthalocyanine;
R$^4$ is an amino group of the formula —NR$^2$R$^3$, in which R$^2$ and R$^3$ are each independently of the other hydrogen or alkyl of 1 to 4 carbon atoms which are unsubstituted or substituted by hydroxyl or sulfo, or is a heterocyclic, N-containing radical such as morpholino or piperidino;
R$^1$ is hydrogen or alkyl of 1 to 4 carbon atoms, such as methyl or ethyl;
G is a phenylene radical which are unsubstituted or substituted by 1 or 2 substituents selected from the group consisting of alkyl of 1 to 4 carbon atoms, halogen, carboxyl and sulfo, or is an alkylene group of 2 to 6 carbon atoms, or a phenylenealkylene radical whose phenylene are unsubstituted or substituted as specified above and whose alkylene moiety is an alkylene of 1 to 4 carbon atoms;
Z is the group of the formula (2)

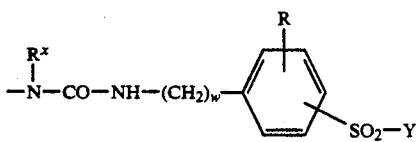

where $R^x$, w, R and Y have the meanings mentioned in claim 1,
a is a number from 2 to 3,
b is a number from zero to 3, and
c is a number from 1 to 2,
the sum total of (a+b+c) being equal to a number from 3 to 4.

10. A copper formazan dye as claimed in claim 1 of the formula (14d)

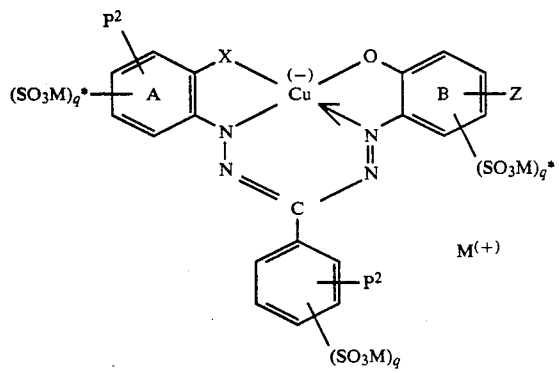

(14d)

in which
Z is the group of the formula (2)

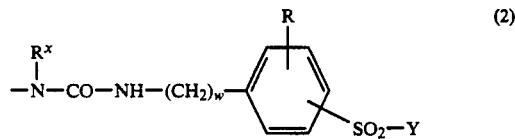

where $R^x$, w, R and Y have the meanings mentioned in claim 1,
M is hydrogen or an alkali metal;
q is zero or 1,
q* is zero or 1,
$P^2$ is independently in each appearance hydrogen, methyl, methoxy, bromine, chlorine, carboxyl or sulfo;
X is carbonyloxy.

11. A copper formazan dye as claimed in claim 1 of the formula

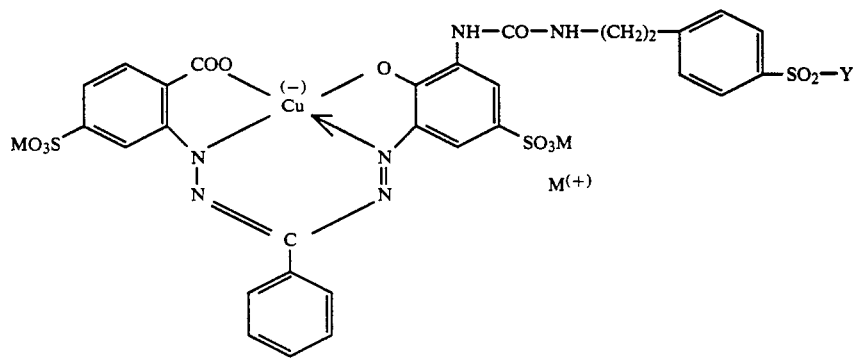

where M is hydrogen or an alkali metal and Y has one of the meanings mentioned in claim 1.

12. A dye as claimed in claim 1 of the formula

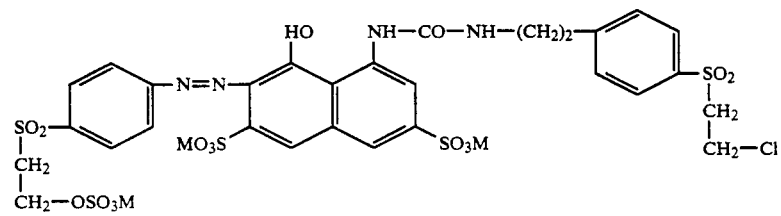

or

-continued

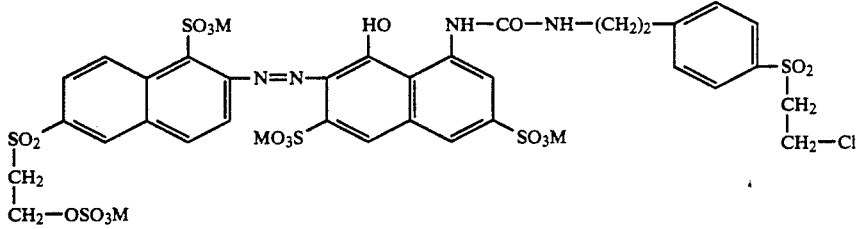

or

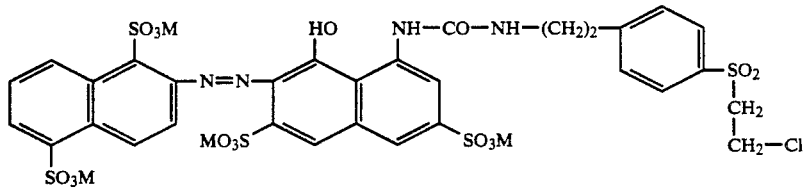

or

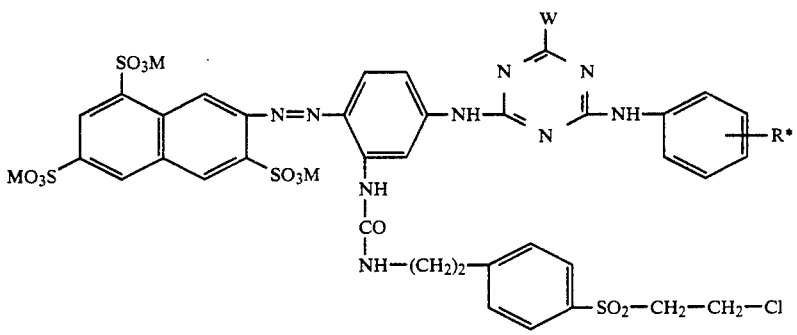

or

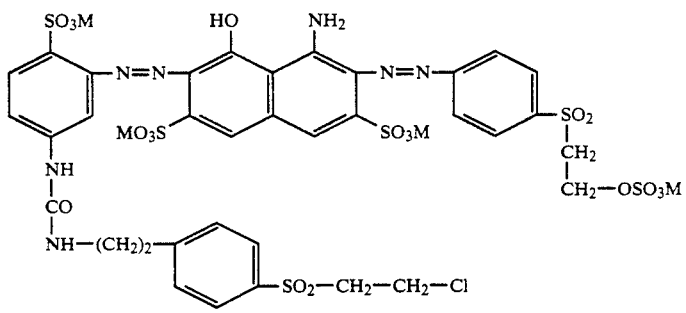

in which M is hydrogen or an alkali metal, R* is vinylsulfonyl, β-sulfatoethylsulfonyl or β-chloroethylsulfonyl, and W is chlorine, fluorine or cyanamido.

13. A dye as claimed in claim 1 of the formula

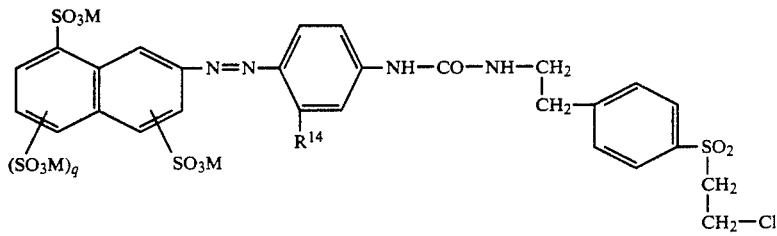

in which M is hydrogen or an alkali metal, 9 is zero or 1 and $R^{14}$ is acetylamino or ureido.

14. A dye as claimed in claim 1, wherein $R^x$ is hydrogen.

15. A dye as claimed in claim 1, wherein w is 2.

16. A dye as claimed in claim 1, wherein R is hydrogen.

17. A dye as claimed in claim 1, wherein Y is vinyl, β-chloroethyl or β-sulfatoethyl.

18. A dye as claimed in claim 1, wherein Y is β-chloroethyl.

19. A dye as claimed in claim 1, wherein n is 1.

20. A method for dyeing a hydroxyl- or carboxamido- or hydroxyl- and carboxamido-containing material which comprises the step of applying to said material an aqueous dye solution or print paste containing the compound of formula (1) of claim 1.

21. A method as claimed in claim 20, wherein: said material is a fiber material, said solution or print paste containing said compound of formula (1) is applied to or introduced into the fiber material, and said compound of formula (1) is fixed in or on the fiber material by means of heat or with the aid of an alkaline agent or with a combination of heat and the aid of an alkaline agent.

* * * * *